(12) United States Patent
Krishnan et al.

(10) Patent No.: US 10,762,548 B1
(45) Date of Patent: Sep. 1, 2020

(54) DIGITAL DATA PROCESSING METHODS AND APPARATUS FOR PERSONALIZED USER INTERFACE GENERATION THROUGH PERSONALIZED SORTING

(71) Applicant: salesforce.com, inc., San Francisco, CA (US)

(72) Inventors: Bharath K. Krishnan, Lexington, MA (US); Rene Borm, Burlington, MA (US); Joshua Correa, Burlington, MA (US); Rene Kessler, Burlington, MA (US); Peter Koch, Burlington, MA (US); Vishwamitra S. Ramakrishnan, Belmont, MA (US)

(73) Assignee: salesforce.com, inc., San Francisco, CA (US)

( * ) Notice: Subject to any disclaimer, the term of this patent is extended or adjusted under 35 U.S.C. 154(b) by 389 days.

(21) Appl. No.: 15/181,594

(22) Filed: Jun. 14, 2016

(51) Int. Cl.
*G06Q 30/00* (2012.01)
*G06Q 30/06* (2012.01)

(52) U.S. Cl.
CPC ..... *G06Q 30/0631* (2013.01); *G06Q 30/0623* (2013.01); *G06Q 30/0641* (2013.01)

(58) Field of Classification Search
CPC .. G06Q 30/0251–0277; G06Q 30/0601–0643; G06Q 30/08; G06F 17/30; G06F 17/3086; G06F 17/30424; G06F 17/30442; G06F 17/30554; G06F 17/30861; G06F 17/30864
See application file for complete search history.

(56) References Cited

U.S. PATENT DOCUMENTS

| | | | | |
|---|---|---|---|---|
| 6,049,777 A * | 4/2000 | Sheena | ................ | G06Q 30/02 705/7.32 |
| 9,104,718 B1 * | 8/2015 | Levy | ................ | G06Q 30/0631 |
| 2008/0255962 A1 * | 10/2008 | Chang | ................ | G06Q 30/0603 705/26.8 |
| 2013/0117208 A1 * | 5/2013 | Dousse | ............. | G06Q 30/0202 706/21 |
| 2015/0339754 A1 * | 11/2015 | Bloem | ............. | G06Q 30/0631 705/26.7 |
| 2016/0071182 A1 * | 3/2016 | Nogues | ................ | G06F 16/435 705/26.7 |
| 2016/0350813 A1 * | 12/2016 | Balasubramanian | | ...................... G06F 16/334 |
| 2017/0032136 A1 * | 2/2017 | Gangadharappa | ...... | G06F 16/35 |

OTHER PUBLICATIONS

Americans Reject Tailored Advertising and Three Activities that Enable It. Sep. 29, 2009. Turow, Joseph. King, Jennifer. Hoofnagle, Chris Jay. Bleakley, Amy, Hennessy, Michael. SSRN. (Year: 2009).*

* cited by examiner

*Primary Examiner* — William J Allen

(57) ABSTRACT

The foregoing are among the objects attained by the invention, which provides, in some aspects, digital data processing methods for generation of customized user interfaces that present links, images or other components representing items of interest to a user in an order that is prioritized as a function of (a) representations in a multidimensional factor space of characteristics of the respective items, and (b) representations in that same multidimensional space of characteristics of "context-indicative items"—e.g., items in which the user has previously shown an interest, as indicated by clicks or other interactions with those items respective components in the user interface.

14 Claims, 23 Drawing Sheets

DIGITAL DATA PROCESSING METHODS AND APPARATUS FOR PERSONALIZED USER INTERFACE GENERATION THROUGH PERSONALIZED SORTING

BACKGROUND OF THE INVENTION

The invention relates to digital data processing and more particularly, by way of non-limiting example, to the automated generation of user interfaces that are customized to individual behaviors. The invention has application, by way of non-limiting example, in e-commerce web sites and e-commerce software apps, among others.

Just as in its brick-and-mortar counterpart, browsing is key to e-commerce sales. Most consumers who visit a retailer have a general idea of what they are looking for. Some may even know the particular model/style, color, size and so forth. But few, if any, know the precise aisle/shelf (in the case of brick-and-mortar retail) or web page (in the case of web retail) whence to find an item for purchase.

Brick-and-mortar retailers take advantage of this by placing items so that a consumer who is walking store aisles for a given offering, say, Levi's 505 jeans, can see related offerings by that same maker (501's, etc.), along with those of competitors. And, while placement is often by product type (jeans vs khakis vs cords, etc.), it can also be by make (Levi's vs Wrangler vs Lee, etc.).

Web retailers struggle with this. There is, as yet, no impactful web equivalent to walking up and down aisles "just looking for something" a/k/a browsing. While software applications known as browsers are ubiquitous on web-ready consumer devices, they might better be known as "searchers," since that is their main function. This might not have been the case in the early days of the web, when users were accustomed to finding items of interest by following category links of the type provided in Yahoo!'s hierarchical directory. However, keyword searching is now the norm, and unless web retailers pre-sort search results or supplement them with "you might also be interested in" links, the consumer is likely to come up short or overwhelmed and, in any case, frustrated.

Web retailers are trying to combat this by monitoring search strings as they are being entered by site visitors and automatically completing them with keyword search predictions that will produce "hits" on the site. For example, a user who visits the website of a clothing retailer and types the characters "je" into the search box might be presented with one, or both, of the auto-completion search predictions "jeans" and "jerseys," depending on which, or both, categories of clothing the retailer actually carries.

Another strategy web retailers employ is to customize search results according to visitors' individual profiles. For example, a visitor that has previously purchased Levi's jeans from a given retail site, might be presented with that maker's offerings over those of other makers in response to a non-specific search for jeans; whereas another visitor to the same site who enters that same search request might be shown Wrangler jeans first in search results, if that is the maker from whom that visitor previously bought such articles.

This is becoming increasingly difficult, however, as web retailing comes to the fore and the number of web consumers rises. The demands on retail web site storage, processing power and other resources necessary to support customization is fast becoming unmanageable.

In view of the foregoing, an object of the invention is to provide improved methods and apparatus for digital data processing and more particularly, by way of non-limiting example, for automated generation of customized user interfaces.

A further object of the invention is to provide such methods and apparatus as are suited for web browsing, e.g., in connection with web retailing.

A further related aspect of the invention is to provide such methods and apparatus as are suited for the generation of search results and/or search suggestions that are personalized for each user.

These and other objects of the invention are evident in the drawings and in the discussion that follows.

SUMMARY OF THE INVENTION

The foregoing are among the objects attained by the invention, which provides, in some aspects, digital data processing methods for generation of customized user interfaces that present links, images or other components representing items of interest to a user in an order that is prioritized as a function of
- representations in a multidimensional factor space of characteristics of the respective items,
- representations in that same multidimensional space of characteristics of "context-indicative items"—e.g., items in which the user has previously shown an interest, as indicated by clicks or other interactions with those items respective components in the user interface.

The items can be, for example, products on an e-commerce web site or an e-commerce app, the names of product categories, recent selections in a category view history, topics in a social network activity history, or other user interactions with a site or across multiple sites, all by way of non-limiting example. The multidimensional space can be one that allows items to be characterized, quantitatively, qualitatively or otherwise, by features such as item/product type, color, size, material, price, and/or whether the item is on promotion, all by way of nonlimiting example. Those characteristics may be explicit, like color, etc., i.e., characteristics that can be inferred more directly from information about the item, and/or about other items in the same or other categories. Additional examples include product characteristics, like "trending," "popular," "best fit," and so forth. Other examples of explicit item characteristics include, e.g., characteristics of the user who selected the item, such as, for example, the user's location, type of device used for access to the web site, e-commerce app, or the like. Characteristics may also be implicit. These are combinations of explicit characteristics—such as, for example, a numerical (or other) combination of the values of trending, popularity and color for a given item—that do not have readily ascribed meanings and/or that can not be measured per se.

The invention provides, in related aspects, a method of user interface generation in which the components representing items of interest are presented in response to a search request made by the user via the user interface. This can be, for example, as a sorted list of auto-completion search predictions that are presented to a user who is in the midst of entering a search request. Or, by way of further example, the components can be presented to reflect results of a search requested by the user. By way of still further example, the components can be presented in listings of application or site navigation options as part of a menu structure, site map, or otherwise.

By way of non-limiting example, digital data systems operating in accord with methods of the invention can monitor a user's navigation, search, and product selections during a web browsing session on an e-commerce site. As the user makes each selection, item listings in subsequently presented menus, search results, etc., are ordered in accord with those (prior) selections and, more specifically, as a dot product or other vector function of (i) representations in a multidimensional factor space (of, say, product type, color, size, material, and price) of products offered on that site, and (ii) representations in that same multidimensional space of the previously selected items. The representations can be, for example, vectors having a magnitude in each dimension of the multidimensional space that corresponds to the size, value, etc., of the respective characteristic of the item. The function can be a dot product or other vector function that transforms the representations into a score and that can include, by way of example, include/exclude filters and so forth. Thus, for example, if the prior selections were of different products, though, all were of the same color and all on-promotion, subsequent menu options, search results and/or autocompletion search predictions could prioritize on-promotion items of that same color.

The invention provides, in further aspects, methods of user interface generation, e.g., as described above, in which the generating step is executed on a web server and the user interface is presented on an application such as a browser or an e-commerce app executing on a client device that is connected to that server, e.g., over the Internet, and that executes markup language received from that server at a selective URL The method can further include capturing the context of a user's use of the application based on tracking the context-indicative item components that she has clicked (or otherwise interacted with) over a selected period of time, e.g., day, week, hour, browser session, and so forth. As evident in the discussion above, that context can serve to identify products, categories or other things in which the user has shown an interest, recently or over some other period of time.

Further aspects of invention present a digital data processing system comprising a first digital data processor (e.g., a web server) that generates at least a portion of a user interface that is presented to a user in connection with execution of an application, and a second digital data processor (e.g., a third-party ranking function server) that is communicatively coupled to the first digital data processor and that captures a context of the user's usage of that application based on one or more textual, graphical and/or other components of the user interface with which the user interacts. The second digital data processor can, according to these aspects of the invention, generate a vector or function based on representations of characteristics of the context-representative items in a multidimensional factor space.

The first digital data processor, moreover, can generate at least a portion of the user interface to present a plurality of links or other components with which the user can interact, where those components represent respective items of potential interest to the user and where those components are presented in a priority based on sort values associated with respective items of potential interest. The first digital data processor generates each sort value by utilizing the aforesaid vector or function in view of a representation of characteristics of the respective item of potential interest in the multidimensional factor space.

According to further related aspects of the invention, a third digital data processor (a client device) that is coupled to the first digital data and to the second digital data processor and that executes the application that presents the user interface.

According to related aspects of invention, the third digital data processor transmits to the second digital data processor information indicative of the user's interaction with the components of the user interface.

In yet still further related aspects of invention, the second digital data processor stores the function to the third digital data processor, and wherein the first digital data processor retrieves the function from the third digital data processor.

These and other aspects of the invention are evident in the drawings and in the discussion that follows.

BRIEF DESCRIPTION OF THE ILLUSTRATED EMBODIMENT

A more complete understanding of the invention may be attained by reference to the drawings, in which.

DETAILED DESCRIPTION OF THE ILLUSTRATED EMBODIMENT

Figure 1:
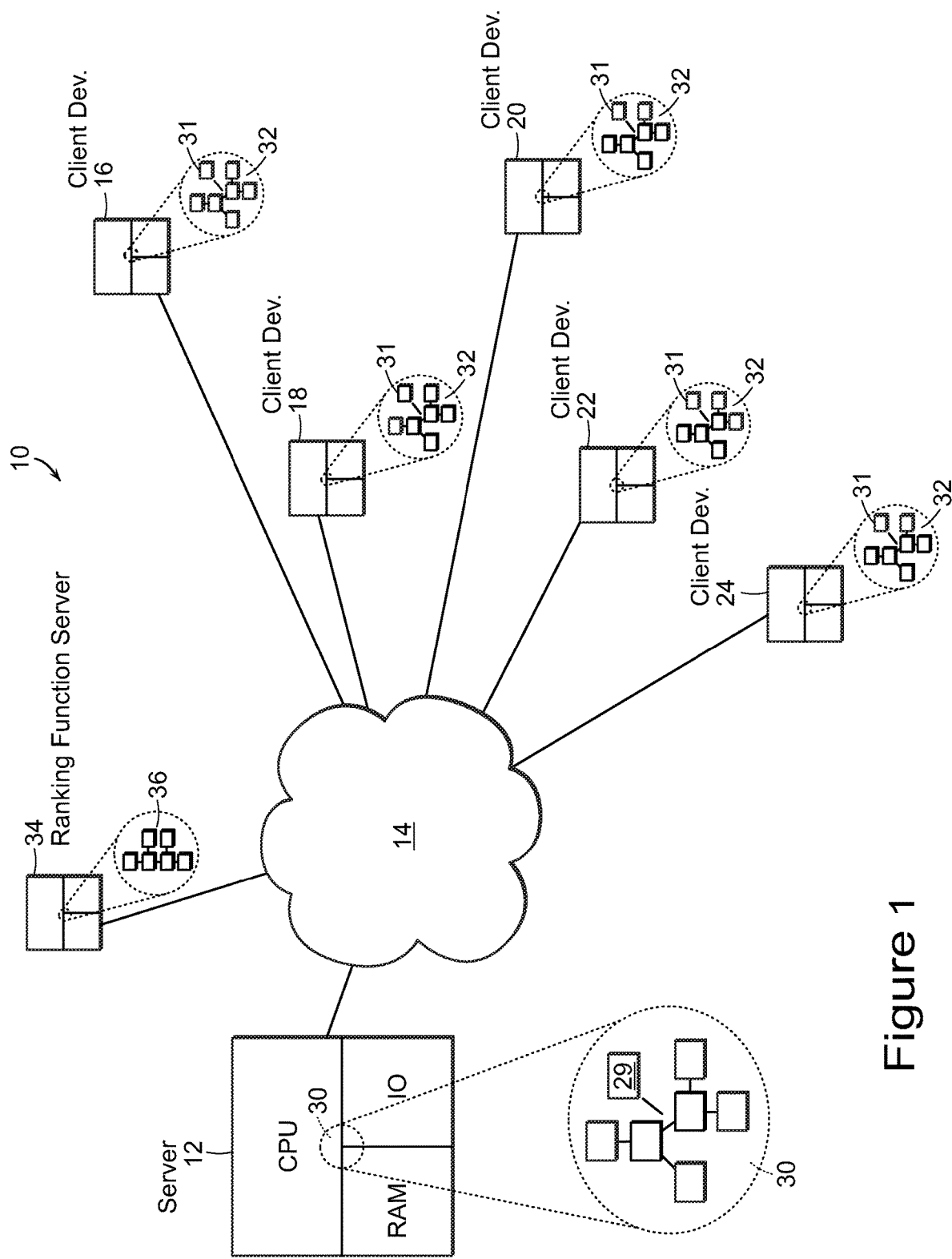
FIG. 1 depicts a digital data processing system for generation of customized user interfaces according to one practice of the invention.

FIG. 1 depicts a digital data processing system 10 according to one practice of the invention for generation of customized user interfaces.

The illustrated system 10 includes a server digital data device 12 that is coupled via network 14 for communication with client digital data devices 16-24. The digital data devices 12 and 16-24 comprise conventional desktop computers, workstations, minicomputers, laptop computers, tablet computers, PDAs or other digital data devices of the type that are commercially available in the marketplace, all as adapted in accord with the teachings hereof. For example, the devices 12 and 16-24 each comprise central processing (CPU), memory (RAM), and input/output (IO) subsections that are of the type conventional in the art as adapted in accord with the teachings hereof. The devices 12, 16-24 may be of the same type, though, more typically, constitute a heterogeneous set of devices.

Devices 12 and 16-24 (and, more particularly, for example, their respective central processing (CPU), memory (RAM), and input/output (IO) subsections) are configured to execute operating systems, a web server 29 (in the case of device 12), web browsers and/or e-commerce applications 31 (in the case of devices 16-24), and/or other applications and functions—all of the conventional type known in the art as adapted in accord with the teachings hereof.

Devices 12 and 16-24 additionally execute an application 30 (in the case of device 12) and applications 32 (in the case of devices 16-24) programmed utilizing conventional software engineering techniques to work in concert with applications 29, 31 in the generation and presentation of customized user interfaces in accord with the teachings hereof.

Although only a single server digital data device 12 is depicted and described here, it will be appreciated that other embodiments may utilize a greater number of these devices, homogeneous, heterogeneous or otherwise, networked or otherwise, to perform the functions ascribed hereto to application 30 and/or digital data processor 12. Likewise, although several client digital data devices 16-24 are shown, it will be appreciated that other embodiments may utilize a greater or lesser number of these devices, homogeneous, heterogeneous or otherwise, running applications 32 that are, themselves, homogeneous, heterogeneous or otherwise.

Network 14 comprises one or more networks suitable for supporting communications between server 12 and data devices 16-24. The network comprises one or more arrangements of the type known in the art, e.g., local area networks (LANs), wide area networks (WANs), metropolitan area networks (MANs), and or Internet(s).

Overview

A fundamental feature of e-commerce websites is the ability for an end user to search for, navigate and find what they are looking for. The illustrated embodiment learns the traits and preferences of each unique user browsing a retailer's website and uses that information to tailor the user interface each sees—specifically, here, for example, the search results they receive and the products and services they see when they navigate through the retailer's menus or other website links.

(Though the discussion in this section and those that follows is directed to customization of user interfaces in connection with e-commerce web sites, it will be appreciated that the teachings hereof are equally applicable to customization of user interfaces in other contexts, whether website-based, app-based or otherwise, all consistent with the teachings hereof.)

For example, consider two potential customers Alice and Carol browsing a retailer's website. On a typical website that does not feature customized user interface generation according to the invention, both Alice and Carol will see the same products if they search for "Dresses" on the site. With customized user interface generation, however, the system automatically analyses past browse and purchase behavior of Alice and Carol and learns their particular preferences and interests. Based on that information, Alice might be shown, for example, dresses with floral patterns in her search results and/or as the first items under "Our Products" menu for the website, yet, Carol might be shown more solid colors. Systems according to the invention fundamentally alter how an e-commerce website behaves to the extent that each consumer is uniquely merchandized to. This leads to a better user experience for the consumer, letting them find what they want quickly as well as higher conversions and better revenue for the retailer.

A further advantage of systems and methods according to the invention is that they are scalable. They can support e-commerce sites with tens of thousands of distinct products and millions of active customers, yet, they can generate customized user interfaces very quickly and without consuming undue resources, e.g., at the server.

The User Interface—Basics

Figure 2:
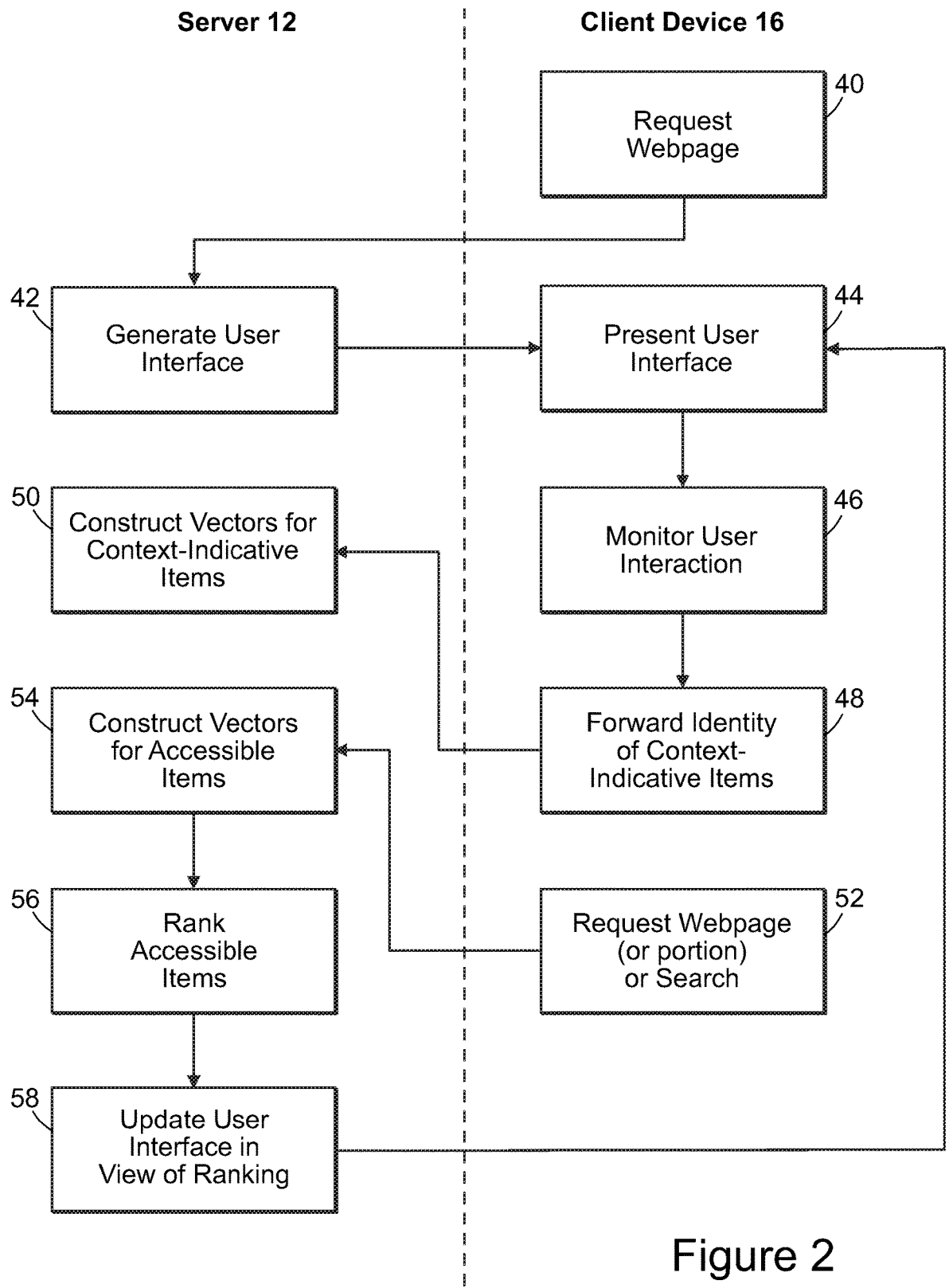
FIG. 2 is a flow chart depicting operation of a system of FIG. 1.

Referring to FIG. 2, the web browser 31 operating on a client device 16, for example, co-operates with the web server 29 on device 12 to generate a user interface that permits the user of the client device 16 to browse, search and otherwise navigate an e-commerce website that is being served by the server 29. To this end, per convention in the art (as adapted in accord with the teachings hereof), browser 31 issues an HTTP request over network 14 to a URL associated with the website. See step 40.

The server responds by transmitting HTML and/or other codes with text, images, links and other components that make up the user interface of the website. See step 42. Although certain components of that interface remain constant during an entire user session (e.g., components reflecting the website logo, first-level menu options, and so forth), the content and/or ordering of other components change with user behavior, as discussed below. For those components, the PHP, Ruby, JavaScript or other server- or client-side code that results in generation of the HTML or that is embedded in it is pre-programmed by the web designer (or others) to invoke application 30 (e.g., via server 29 in the case of client-side code) to obtain item rankings that determine the content and order of the interface components that represent them. Examples of this include search result pages or frames, dynamic widgets (e.g., search widgets, dynamic menus), and so forth.

The browser 31 or other functionality on device 16 executes the HTML and/or other codes to present the user interface, which includes static components such as fixed images and links and/or dynamic components such as drop-down menus, popups, etc., all per convention as adapted in accord with the teachings hereof. See step 44.

As is common to support retail (and other) websites, the server 29 can utilize a search engine (not shown) to implement implicit navigation as well as explicit search. An example of implicit navigation is a user interface component presented by browser 31 via which the user can interact (e.g., via a mouse click, screen touch, text entry, radio button selection, mouse-over, etc., all collectively referred to here as a "click" or "mouse click" for convenience) with a top-level navigational link (e.g., the category "Women's Clothing") and, then, successive links specifying the sub-categories, styles, etc., e.g., "Dresses," then "Color," then "Size".

An example of explicit search is a "search box" or other such user interface component into which the user can type a category, sub-category and/or further details (color, size, etc.) in order to retrieve a information about and/or links to particular items of interest. In the illustrated embodiment, the search box/component accepts input In the conventional forms known in the marketplace; the user can type a noun, an adjective, a description of what he/she is looking for, etc. For example, a search for "Dresses" retrieves a listing of products accessible via the website for that category of clothing. The search engine can monitor the search box as the user is typing a search request in order to implement, type-ahead search a/k/a auto-completion search prediction, where a modal results window updates as the user types in her query.

In some embodiments, the search engine can employ user- and/or website operator-specific rules for sorting search results and presenting textual links or other user interface components representative thereof (e.g., user-selectable images, etc.). Common examples of the latter are engines and/or website that generate a user interface (for presentation via browser 31) that permit the user to select whether search results are displayed by popularity or relevance. Examples of the latter are those that permit the website operator to specify whether search results are to be ordered by popularity, availability, relevance to search and/or combinations of the foregoing.

User Interface Customization

In the illustrated embodiment, the application 30 (in the case of device 12) and applications 32 (in the case of devices 16-24) work in concert with with web server 29 and web browsers 31, respectively, in the generation and presentation of customized user interfaces. These interfaces present items of interest (e.g., navigational links, search results, etc.) to the user of the respective web browser in an order that is prioritized as a function of representations in a multidimensional factor space of characteristics of the respective items to be presented, representations in that same multidimensional space of characteristics of "context-indicative items"—e.g., items in which the user has previously shown an interest, as indicated by clicks or other interactions with their respective components in the user interface.

This priority-based ordering, or "personalized sorting," changes in real-time as the user of each respective web browser 31 traverses a web site and is particular to his or her prior behavior on the respective web browser.

In some embodiments, it is only prior behavior on the same website (i.e., the same URL or set of related URLs making up a given site) that is taken into account when evaluating representations of "context-indicative items." In other embodiments, prior behavior on other sites accessible by the respective browser 31 and/or in other applications on the same client device are taken into account, e.g., social network activity history, product review history, and so forth, all by way of example.

The function referred to above can be, for example, a vector dot product (or other function), and the scalar value that results can employed for prioritization (or sorting) of each respective item to be presented. Alternatively, that scalar can be used in combination (weighted or otherwise) with other factors made available by the server 29 or respective browser 31 for presentation of such items (e.g., item popularity, availability, and/or relevance to search, to name a few).

The Model

In the illustrated embodiment, personalized sorting is effected, first, by building a model of each user's prior behavior based on his/her context-indicative items and, next, by applying that model to each item to be presented by the user interface in order to "score" that item, i.e., to determine its priority for presentation to the respective user Building the Model Model building is effected, in the simplified embodiment of FIG. 1, by application 30 executing on web server 12 operating in concert with browser 31 and/or application 32 executing on each respective client device.

To that end, the application 32 executing on device 16 in conjunction with web browser 31, for example, monitors each mouse click by the user of that device who is running the respective web browser 31 to identify context-indicative items, e.g., items in which the user has shown an interest. See step 46. As noted above, "mouse click" is used here to reflect any interaction by the user with a user interface component representing an item. This can include, for example, clicking on a textual link naming that item or a graphical component showing It, viewing and/or scrolling through a web page displaying the item, reading or writing a review relating to the item, typing the item into a search box, ordering items, and so forth. Monitoring of "mouse clicks"—i.e., identifying those user interface components with which the user has interacted—can be performed in any conventional manner known in the art.

For each such mouse click, the application 32 executing, say, on device 16, identifies the respective context-indicative item—i.e., the respective item represented by the user interface component with which the user interacted. In the illustrated embodiment, application 32 makes that identification from identifier supplied as a tag with the HTML (or other codes) used to present the respective user interface item. In an embodiment for use in personalized sorting of items from an e-commerce website, for example, the identifier can be a SKU code. Of course, other identifiers can be used in addition or instead, depending upon application. For example, an embodiment for use with books might utilize an ISBN number; other embodiments might use a proprietary set of product or item codes; and so forth, all by way of non-limiting example.

Once the application 32 of device 16, for example, has identified the context-indicative item (or, at least, obtained an identifier for it), it passes that identification to application 30 via network 14. Step 48. Receiving successive such ID's from a given user—a/k/a the user's "behavior" stream—makes it possible for application 32 to monitor behavior of the user of device 16. Consistent with the comment above, this may be in connection with mouse clicks on a given website or it may be behavior across multiple web sites or applications. In some embodiments, it is behavior over multiple applications on the same client device (e.g., 16), and so forth.

In order to build the model, application 30 constructs a vector in a common, multidimensional space for each such context-indicative item identified in the behavior stream. See step 50. That space, which can have two or more dimensions, may have up to one hundred or more dimensions for embodiments used in connection with customizing user interfaces for e-commerce sites. Each dimension reflects a different respective characteristic of items that may be reflected in the behavior stream of all users to a given site (or a subset of such users), across multiple such sites, or across multiple applications, depending on the embodiment. Those characteristics can include, for example, meta-data like product name, color, size, material, as well as commercial attributes like price, whether the product is on promotion, product category and subcategories, as well as other mappings of the product into other ontologies. As noted above, the explicit product characteristics can include the categories "trending," "popular," "best fit," and so forth. These are characteristics that can be inferred from information about the item and/or about other items in the same or other categories. Other examples of explicit characteristics include characteristics of the user such as geographic location, type of device used for access to the web site, e-commerce app, or the like. Characteristics can also be implicit. These are combinations of explicit factors—such as, for example, a numerical (or other) combination of the values of trending, popularity and color for a given item—that do not have readily ascribed meanings and/or that can not be measured per se.

The vector in the multidimensional space of a given context-indicative item is the enumeration of the values of its characteristic in each such dimension. Those values may be measures of the respective characteristic in the that dimension (e.g., "32" for a dimension for trouser length in inches), true or false (e.g., for a dimension that characterizes features that are Boolean in nature, e.g., whether an item is on promotion), an ordinal number (e.g., for a dimension that characterizes color with non-numerical values), and so forth.

In preferred embodiments that utilize vector dot products as discussed below, all values are preferably numerical (or converted to ones that are). As noted, other embodiments can use other functions that combine representations into a score that can be used for sorting and that can include, by way of example, filters for including/excluding specified items or classes of items, and so forth.

In order to build a vector in the common, multidimensional space for a given context-indicative item, the application 32 of the illustrated embodiment obtains values characterizing the item In each of those dimensions from a database or otherwise. Such a database, for example, can be co-housed with server 12 or accessible (via network 14 or otherwise) therefrom. Typically, this is the same database as that searched by the search engine (not shown) of the web server 29. Values for a given item can be obtained via a database lookup using the identifier supplied for it by the respective browser 32 in the behavior stream for the respective user.

In the illustrated embodiment, the application 32 builds such a vector for each context-indicative item in the behavior stream of each user of web browser 31 visiting a given website or set of sites. Mathematically, such a vector for a product P in a K-dimensional space can be represented as follows:

$$P \to X_i \text{ for } i \text{ in } (1 \ldots K)$$

The application 30 can retain all such vectors for a given user, or a subset of those vectors representing more recent user behavior and/or a subset representing only certain types of context-indicative items (e.g., on-promotion products, items reflecting categories or ontology entries only, and so forth). Thus, for example, in some embodiments, the application 30 retains for each user vectors for ten most recent context-indicative items; in other embodiments, different numbers of vectors are retained—say, five, twenty, and so forth. In some embodiments, vectors are maintained only from the beginning of a given session (e.g., from when the user first visits the website or set of websites in a given browser session), while in other embodiments vectors from prior sessions are retained (e.g., in cookies or otherwise) for use at the start of each new session.

Customizing the User Interface

As each new vector is generated for a context-indicative item in Step 50, the loading or refreshes of web pages, widgets and other aspects of the user interface by the web browser 31 of the respective client device, e.g., 16, results in changes to the user interface that are personalized to the user's recent behavior. This is effected by the preprogrammed server- or client-side code discussed above in "The User Interface—Basics" that calls for obtaining item rankings that determine the content and order of the interface components that represent those items.

More particularly, referring to FIG. 2, as the user interacts further with the user interface presented by web browser 31 of client device 16—for example, by clicking on a menu widget, typing text into a search widget, clicking on a hypertext link, and so forth—the browser issues an HTTP or other request to the web server 29 for loading or refresh of a page, widget, etc. See step 52. Such requests may result from execution of the aforementioned pre-programmed client-side code or they may result in execution of the aforementioned pre-programmed server-side code.

In either case, application 30 is invoked (e.g., in connection with the search engine of web server 29) to obtain item rankings that, in turn, determine the content and/or order of the interface components that represent those items in the loaded/refreshed page, widget, etc. The identity of the respective items can be supplied explicitly with the invocation (e.g., via an identifier of the sort discussed above in "Building the Model") or implicitly (e.g., via a search expression or portion thereof, a regular expression, a category name or other specifier). In the case of implicit item identifiers, application 30 can match that expression, name or other specifier against a database of items accessible to the user for purchase or otherwise via the website to determine the identity of respective item. This can be, for example, the same database from which the search engine of the web server 29 draws or otherwise.

For each item to be presented in the page, widget, etc., that has been requested for refresh/reload, the application 30 constructs a vector. See step 54. This is done in the same manner as discussed above in "Building the Model," using the same common, multidimensional space as for context-indicative items received from the behavior stream of the same respective user. As a practical matter, that space is typically used for all vector representations of the same site, across multiple such sites, or across multiple applications, depending on the embodiment.

In order to determine a ranking of each item to be presented in the page, widget, etc., that has been requested for refresh/reload, the application 30 performs a dot product (or other vector function) of the vector for that item determined in step 54 against the vectors generated in step 50 and retained, as discussed above, to represent recent user behavior. See step 56. The application 30 passes the resulting scalar back to the requestor (e.g., server-side code on the web server 29 or client-side code on the browser 31) for use in prioritizing (or sorting) of each respective item in the page, widget, etc. That ranking can be used directly for that purpose, or in some embodiments, it is used in combination (weighted or otherwise) with other factors, such as item popularity, availability, and/or relevance to search, to name a few, as discussed above.

Alternate Embodiment for Scalability

To improve scalability, the system 10 of FIG. 1 can include an additional server 34, referred to here as a ranking function server, that is coupled to network 14 for communications with server 12 and client devices 16-24. Server 34 can comprise a conventional desktop computer, workstation, minicomputer, laptop computer, tablet computer, PDA or other digital data devices of the type that are commercially available in the marketplace, as adapted in accord with the teachings hereof. And, as with devices 12 and 16-24, device 34 can comprise central processing (CPU), memory (RAM), and input/output (IO) subsections that are of the type conventional in the art as adapted in accord with the teachings hereof. Server 34 (and, more particularly, for example, its central processing (CPU), memory (RAM), and input/output (IO) subsections) are configured to execute an operating system of the conventional type known in the marketplace and ranking function application 36. Although only a single server 34 is depicted and described here, it will be appreciated that other embodiments may utilize a greater number of these devices, homogeneous, heterogeneous or otherwise, networked or otherwise, to perform the functions ascribed hereto to application 36.

Figure 3A:
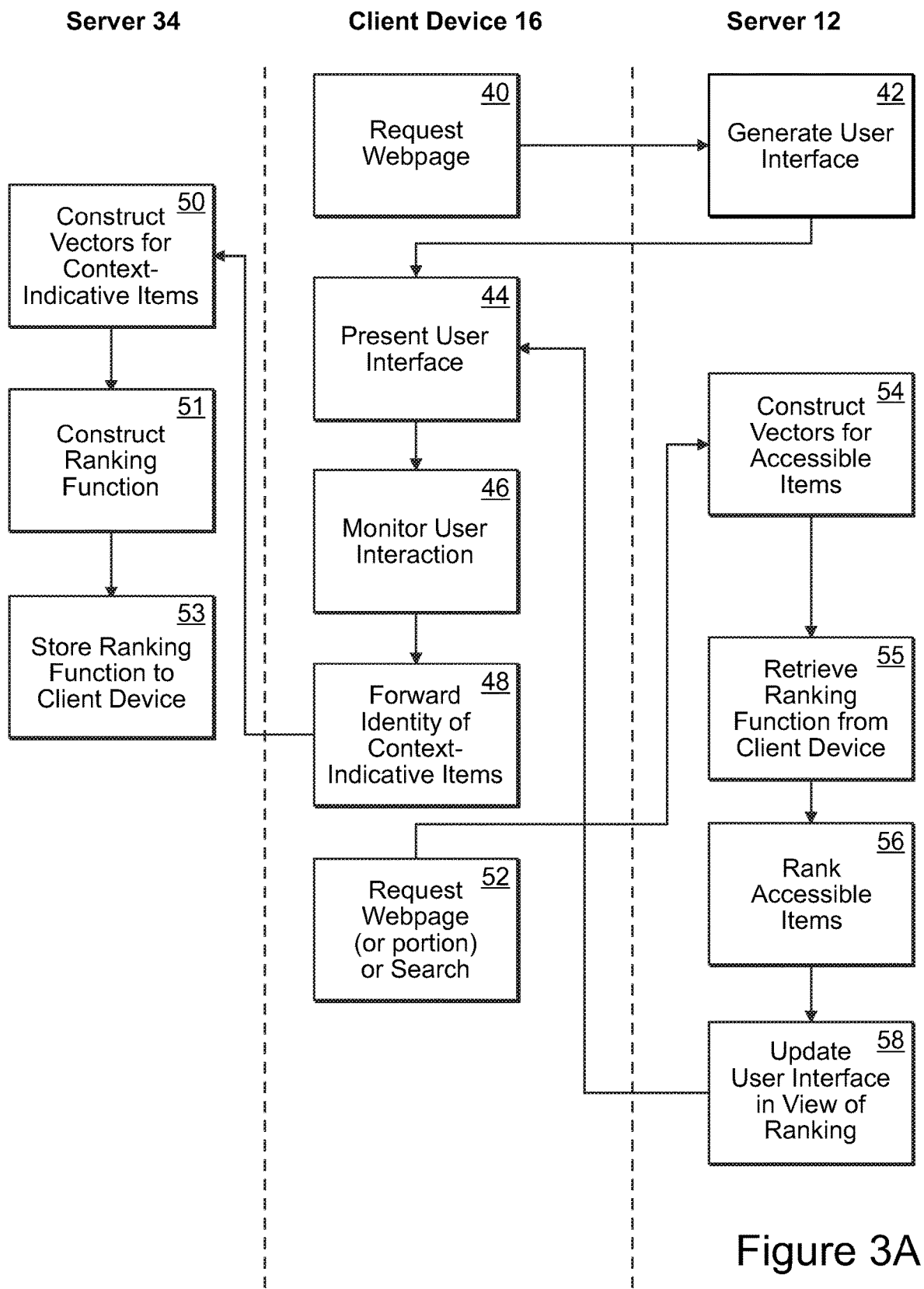
FIG. 3A is a flow chart depicting operation of the system of FIG. 1 utilizing a ranking function server.

FIG. 3A depicts operation of an embodiment of the invention that utilizes the server 34. As shown in that drawing, server 34 and, more particularly, application 36 executes Step 50 described above in connection FIG. 2 and, as a consequence, that step need not be executed by server 12 itself. Step 50 is otherwise executed as discussed above in connection with FIG. 2. To the extent database or other resources available on server 12 are necessary for that purpose, application communicates with server 12 via network 14 to access those resources.

To facilitate this off-loading of functionality from server 12 to server 34, Step 48 passes the identification of context-indicative items to application 36, rather than application 30 as described above in connection with FIG. 2. Step 48 is otherwise executed as discussed above in connection with FIG. 2.

To facilitate use by the server 12 and, more particularly, application 30 of the vectors constructed in Step 50, the application 36 can store those to the client device, e.g., 16, the behavior of whose user those vectors reflect. However, in the embodiment of FIG. 3A, the application instead stores an executable function that embodies those vectors and that can be directly executed in order to determine rankings based on those vectors. See Step 51. In the illustrated embodiment, that function is stored to the respective client device, e.g., 16, in lieu of merely the vectors it embodies. See step 53

In the embodiment of FIG. 3A, server 12 operates as discussed above in connection with FIG. 2, except insofar as execution of Step 50, as discussed above. An additional exception is that in order to rank items in Step 56, application first retrieves the ranking function from the respective client device (see Step 55) and uses that function, rather than vectors and a dot-product (or other) function, to determine the ranking of item to be presented in the page, widget, etc., that has been requested for refresh/reload.

Likewise, in the embodiment of FIG. 3A, client device 16 operates as discussed above in connection with FIG. 2 except insofar as Step 48 and except insofar as application 32 cooperates with application 36 (on server 34) to store the ranking function.

Further Alternative Embodiment for Scalability

Figure 3B:
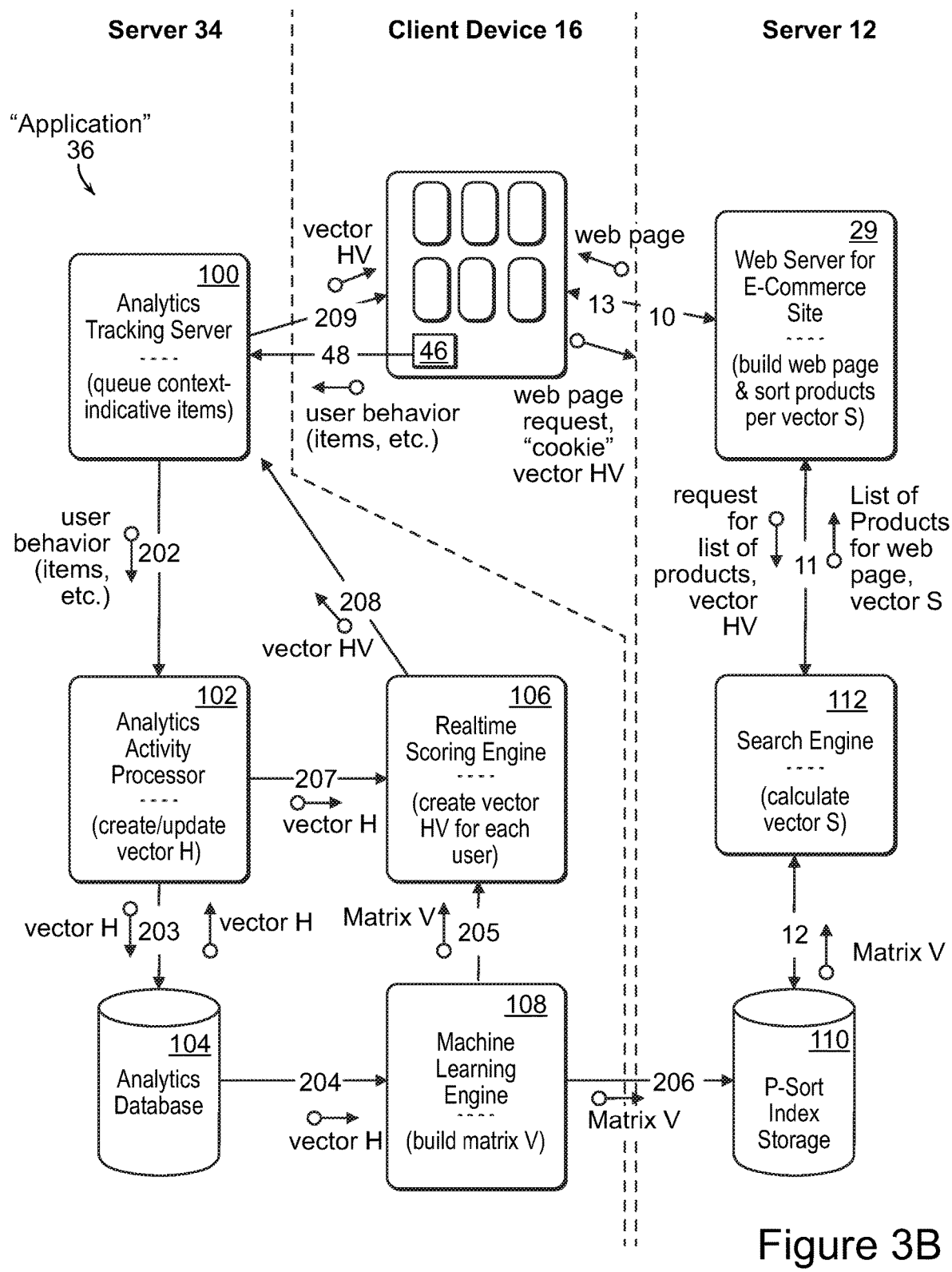
FIG. 3B depicts an architecture and alternate method of operating a system of FIG. 1 utilizing a ranking function server.

FIG. 3B depicts the architecture of a system 10' according to the invention that utilizes the server 34, e.g., for scalability. The system 10' operates in the manner of the embodiments described above in connection with FIGS. 1, 2, and 3A, except as detailed below and shown in FIG. 3B.

Thus, for example, functionality referred to above as "application 36" comprises, in the embodiment of system 10', analytics tracking server 100, analytics activity processor 102, real-time scoring engine 106, and machine learning engine 108, which operate and cooperate in the manner discussed below and shown in the drawing. The foregoing exchange information with analytics database 104, as shown in the drawing and discussed below. The elements 100-108 can be co-housed and executed on a single digital data processor, e.g., server 34. Alternatively, one or more of them (or groups thereof) can be co-housed and/or executed on different respective such digital data processors that are coupled for communication to one another via a local network, global network, or otherwise.

Although single ones of elements 100-106 are shown in the drawing, in practice multiple instantiations of each or any may be provided, again, co-housed and executed on a single data processor and/or among multiple such devices. Where multiples of any given element are utilized, load balancers (not shown) of the type known in the art may be utilized to distribute processing loads among them.

The Model

Referring back to the section entitled "Building the Model," in lieu of retaining individual vectors for context-indicative items in the behavior stream of each user of web browser 31 visiting a given website or set of sites, the system 10' creates and maintains a vector H for each user that (a) identifies context-indicative items with which that user has interacted and that, in the embodiment of system 10', also (b) indicates the weight (or "quality") of that interaction. The illustrated embodiment utilizes the procedure discussed below to create that vector H for each user. This is in lieu (or in addition to) the processes discussed above in connection with Step 50 to create vectors for the context-indicative items.

By way of background, the context-indicative items maintained in vector H of the embodiment of system 10' can include the full range of context-indicative items discussed above (e.g., names of product categories, recent selections in a category view history, etc.). In this embodiment, however, vector H for use in connection with generation of customized user interfaces for an e-commerce site maintains as context-indicative items those representative of products accessible on that site. For such an e-commerce site with N products, the vector H for a given user may be expressed as:

$$H[i], \text{ for } i=1 \ldots N.$$

Weights accorded the items in the vector H may be determined at the discretion of the operator of the e-commerce site; by way of nonlimiting example, they can depend on the type of interaction, the length of time of the interaction, the mode of interaction, etc., of the user with the item's respective component in the user interface.

As with the embodiments discussed above, application 32 of system 10' monitors user interaction and passes the identification of each context-indicative item (i.e., each product in which the user has shown interest) to analytics tracking server 100 in the manner paralleling the operations discussed above in connection with Steps 46 and 48. In some embodiments, that server 100 is just one of many such servers serving similar function running globally behind load balancers (not shown).

Along with each item, the application can pass to the server 100 the identification of the respective user and an indication of the weight to be accorded that context-indicative item. Consistent with the discussion above, this can be, by way of non-limiting example, an indication of the type and length of interaction with that item's respective user interface component.

In step 202, the activity tracking server 100 queues the received context-indicative items (along with the respective user identifications and weighting indications) to the analytics activity processor 102, which (again) in some embodiments is just one of many such processors serving similar function running globally behind load balancers.

On receiving that information from the tracking server 100, the analytics activity processor 102 creates/updates the vector H maintained by system 10' for the respective user. It does this by retrieving the vector for that user from analytics database 104 (or, if no such vector exists, initializing a new vector) and updating the entry in that vector for the respective context-indicative item (i.e., the respective product) with a weighting factor based on the weighting indication received from the server 100). Conversion of those weights to weighting factors is implementation dependent. Once updated, the vector is stored back to the database 104 and copied to the realtime scoring engine 106. See steps 203 and 207.

In lieu of step 54 discussed above to create vectors for accessible items on the site currently being visited by the respective user, the server 34 of the embodiment shown in FIG. 3B builds a matrix V with rows that represent each product accessible on the (e-commerce) website currently being visited by the respective user and with columns that represent projections of each such product into the same common, multidimensional space as for context-indicative items received from the behavior stream of the same respective user (and, as a practical matter, from all users of that site).

The matrix V is built by the machine learning engine 108 by projecting, into the multidimensional space, characteristics of each product in the e-commerce site catalog. For an e-commerce site with N products and a multidimensional space of M, the matrix V may be expressed as:

$$V[i][j], \text{ for } i=1\ldots N, j=1\ldots M.$$

In the embodiment of FIG. 3B, the matrix V is built via machine learning, e.g., from natural language and other analyses of product descriptions, as well as from the sites users' historical interaction with the product as discerned from product reviews, and so forth. This latter aspect is depicted by Step 204 in the drawing, showing transfer of users' behavioral data (i.e., context-indicative item selections), e.g., collected as discussed above in connection with Steps 48, 202-203, to machine learning engine 108. Alternatively or in addition to being built via machine learning, the matrix V can be constructed (in whole or part) from projections entered by the operator of the aforementioned e-commerce website.

Matrix V can, as a consequence of the foregoing, be said to represent past interactions of all users of the e-commerce site, as well as predictions of future such interactions. In practice, matrix V is not necessarily created/updated in sync with the other steps illustrated in FIG. 3B, e.g., in the midst of each user's interaction with the site, but rather is executed episodically or periodically, e.g., hourly, daily, weekly or so forth.

Once the matrix V is created/updated, the machine learning engine 108 transfers it to the realtime scoring engine 106. It also transfers the matrix V to the personalized sort ("p-sort") index storage 110 used by the ecommerce search engine 112, both of which are co-housed and executed on the server 12 in the illustrated embodiment, but which may be housed and/or executed elsewhere. As above, although only a single server 12 and single instances of elements 110, 112 are shown in the drawing, in practice multiple instantiations of each or any may be provided, again, co-housed and executed on a single data processor and/or among multiple such devices. Where multiples of any given element are utilized, load balancers (not shown) of the type known in the art may be utilized to distribute processing loads among them.

To determine a ranking of each item to be presented in a web page, a user interface widget, etc., that has been requested for refresh/reload by a user via the user interface generated by an e-commerce site hosted by server 12, the search engine 112 of the embodiment shown in FIG. 3B creates for that user a unique, real-time ranking of each product in the catalog of that site. This is denoted by the vector S which has 1 row (for that one user) and as many columns, N, as there are products accessible via the e-commerce site. The "sort" values of the entries in S give rank of the respective products for that user, all as discussed below.

To this end, the real-time scoring engine 106 does the following calculation and sends the result, a vector HV, to the analytics tracking server 100. See Step 208. As noted above, the term M denotes the number of dimensions of the feature space on to which each product is projected:

```
function calculateHV( ) {
    // Initialize a vector of size M with 0s
    HV = Vector(M)
    for(i = 0; i < H.length; i++) {
        // Multiply only if there is an interaction
        if( H[i] != 0 ) {
            Vi = V.getRow(i)
            for(j = 0; I < Vi.length; j++) {
                HV[j] += H[j]*Vi[j]
            }
        }
    }
    return HV
}
```

The analytics tracking server 100, in turn, sets a cookie that on the respective user's device, e.g., device 1, that contains the value of HV. See Step 209.

Referring back to step 52 (discussed above), when the browser 31 on the respective user's device (e.g., 16) issues an HTTP or other request to the web server 29 for loading or refresh of a page, widget, etc, that server 29, in turn, requests a list of products from search engine 112, as well as an indication of the order in which those products should be displayed, i.e., the vector S. That engine 112, in turn, calculates that vector (i.e., the personalized sorting scores of products for the requesting user). For this purpose the engine 112 uses the cookie value HV stored on that user's browser 31, as well as the "model" matrix V stored in the p-sort index storage 110 by doing the following calculation. N here denotes the number of products in the catalog:

Function calculateScores( ) {

```
// Initialize a vector of size N with 0's
S = Vector(N)
for(i = 0; i < V.length; i++) {
    for(j = 0; j < HV.length; j++) {
        S[i] += V[i][j]*HV[j]
    }
}
return S
}
```

The search engine 112 also searches the site product database (not shown) in the conventional manner and returns the requested list of products, along with the vector S, to the vector S to server 29. That server, in turn, constructs the user interface representing the page requested by the user with user interface components (e.g., images and/or links) representing products (or other items of potential interest) ordered in accord with the vector S. Specifically, listed products (or items) whose respective sort values (i.e, entries) in S are larger are given higher priority than those whose respective sort values (entries) are lower. As such, vector S is functionally equivalent to the dot product generated in step 56, albeit, it represents the dot product of vector H (representing the respective user's behavior) against matrix V (representing all products accessible from the respective e-commerces site).

The browser 31 of the client device 16 displays that user interface and continues monitoring the respective user's interaction with it.

Examples of Operation

Operation of systems, e.g., 10 and 10', according to the invention is illustrated, by way of example, in FIGS. 4a-4e and 5a-5e, each showing a sequence of user interfaces generated by the server 12 and presented to respective users of client devices 16, 18 by browsers 31 executing on those devices in a system according to the invention. In the embodiments shown in FIGS. 4a-4e and 5a-5e, it is assumed for sake of simplicity that vectors reflecting context-indicative items of interest for both users/devices are maintained by application 30 only from the beginning of the respective browser sessions; other embodiments may vary in this regard, as discussed above. Moreover, in the discussion that follows, actions of the users of devices 16, 18, as well as of the server 12 and client devices 16, 18 in generating and presenting user interfaces for those devices, are described in parallel. This is not intended to imply that those actions necessarily occur at or around the same times; they may occur at quite different times.

Figure 4A:
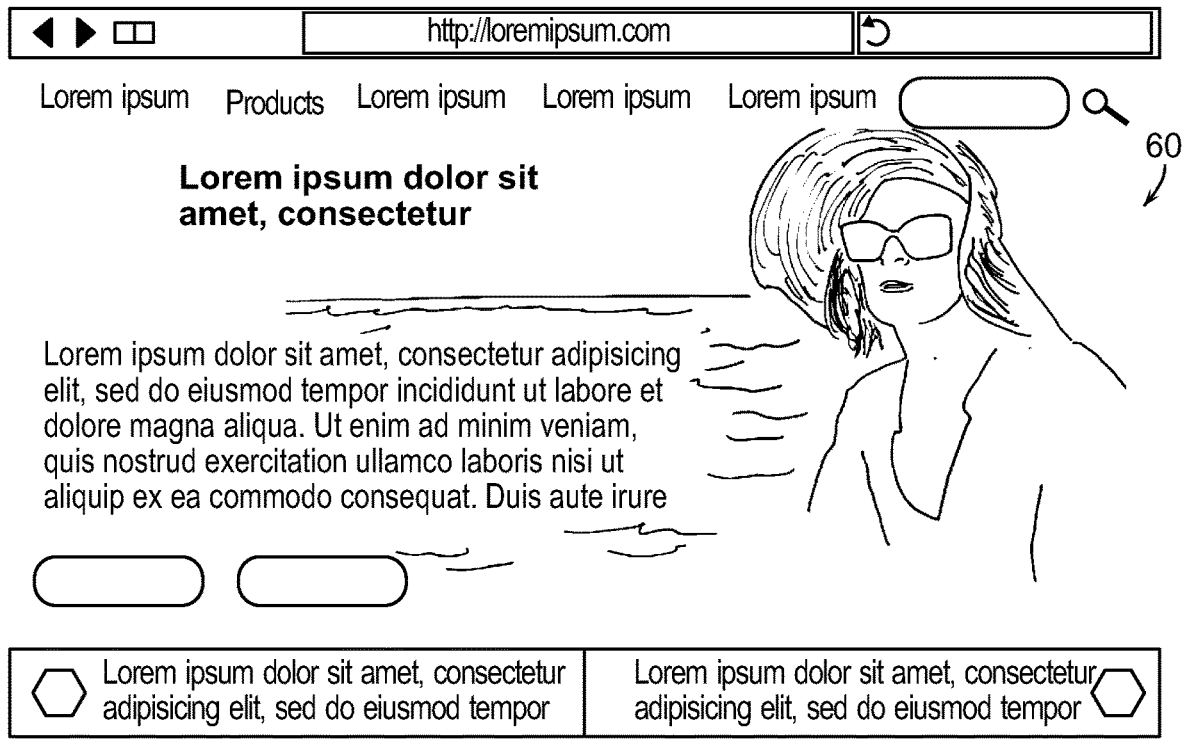
FIGS. 4a-4e depict a sequence of user interfaces of the sort generated for a first user by a system according to the invention.
Figure 5A:
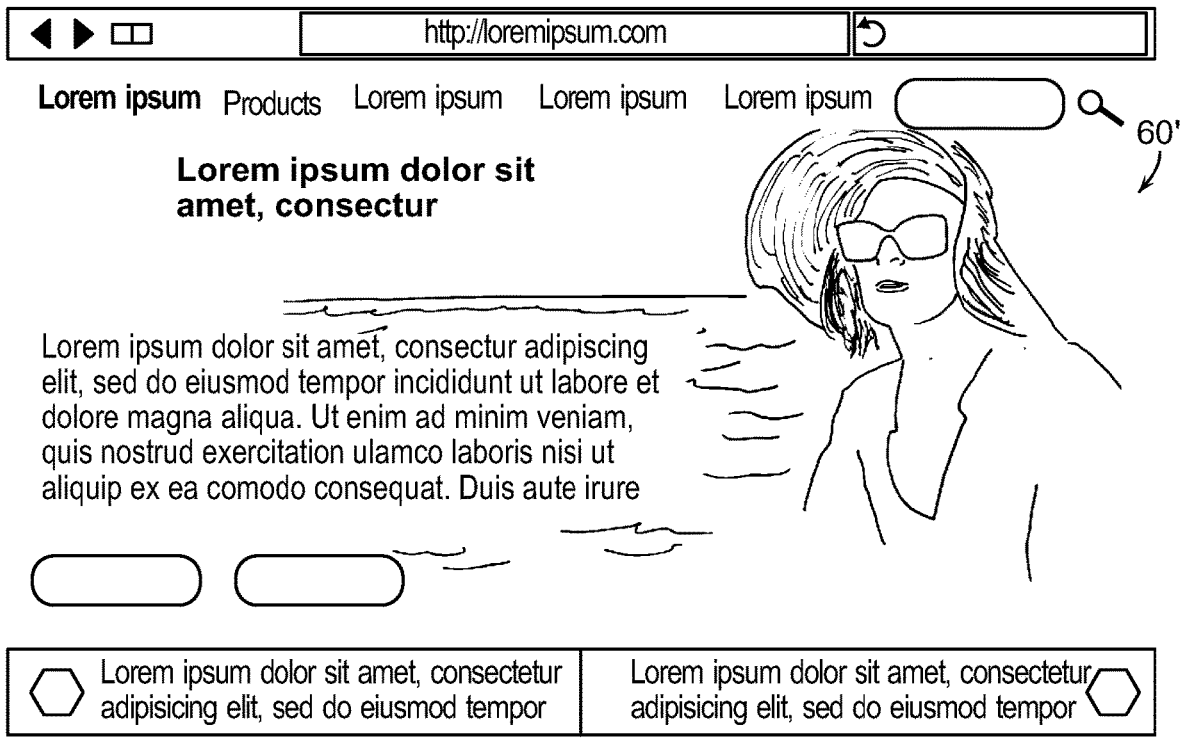
FIGS. 5a-5e depict a sequence of user interfaces of the sort generated for a second user by a system according to the invention.

FIG. 4a depicts a "landing" web page 60 that is generated by server 12 and presented by browser 31 of device 16 as a user interface in response to a request by the user of that device 16 (via its browser 31) for the URL http://loremipsum.com. FIG. 5a similarly depicts the landing web page 60' generated by server 12 and presented by browser 31 of device 18 as a user interface in response to a request by the user of that device 18 (via its browser 31) for the same URL. In the embodiment illustrated here, both users receive the same user interface (i.e., user interface 60 is identical to user interface 60') because vectors reflecting their respective context-indicative items of interest have not yet been generated populated.

Figure 4B:
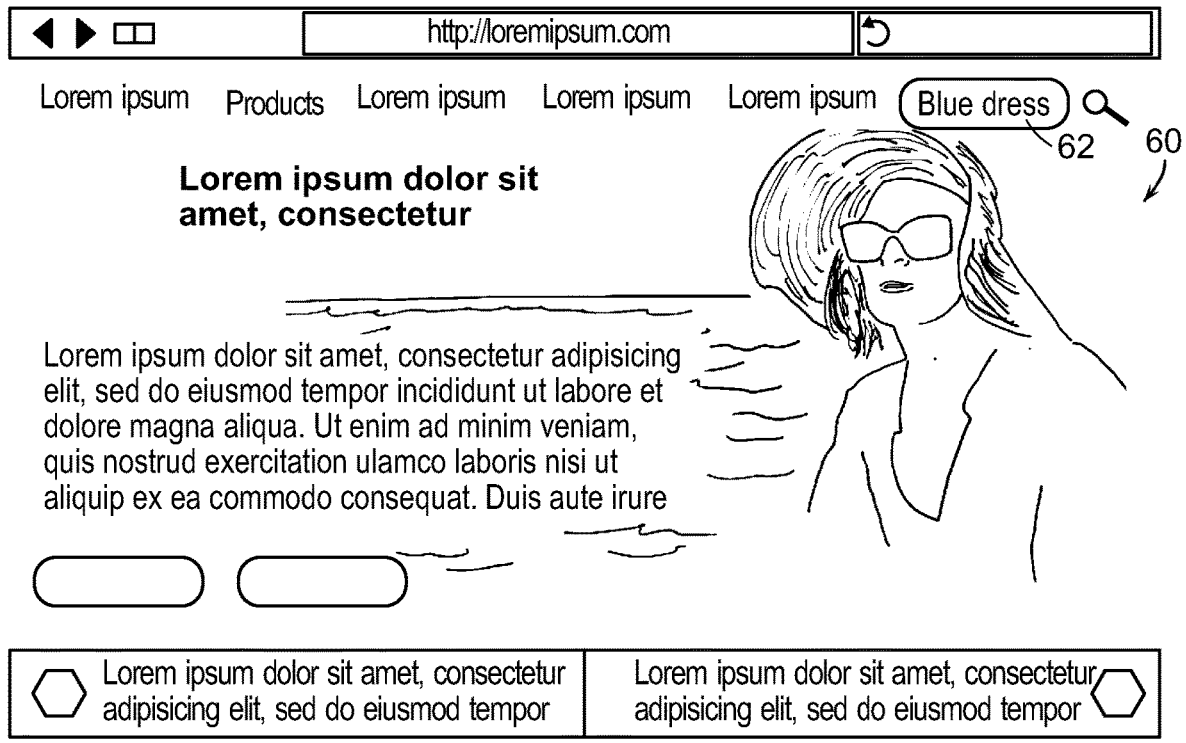
Figure 5B:
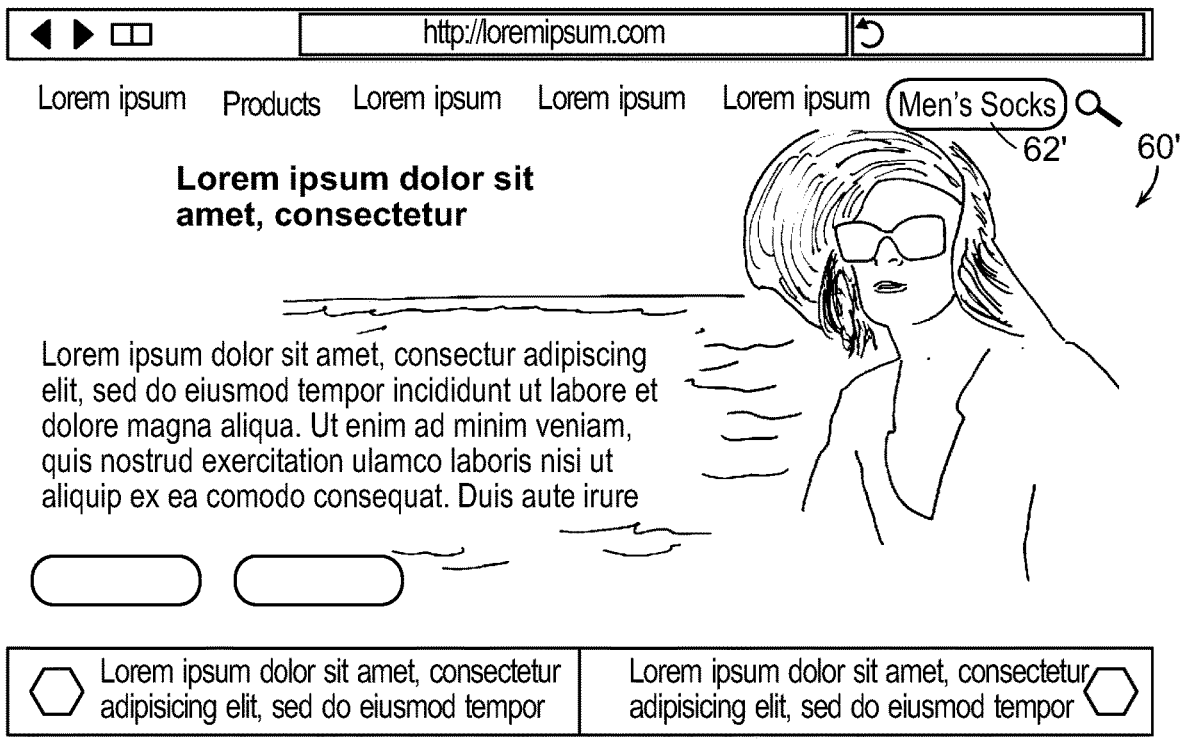

Referring to FIG. 4b, the user of device 16 subsequently types "Blue Dress" into the search box 62 of the user interface 60 of device 16. Referring to FIG. 5b, the user of device 18 types "Mens' Socks" into search box 62' of the interface 60' presented on device 18.

Figure 4C:
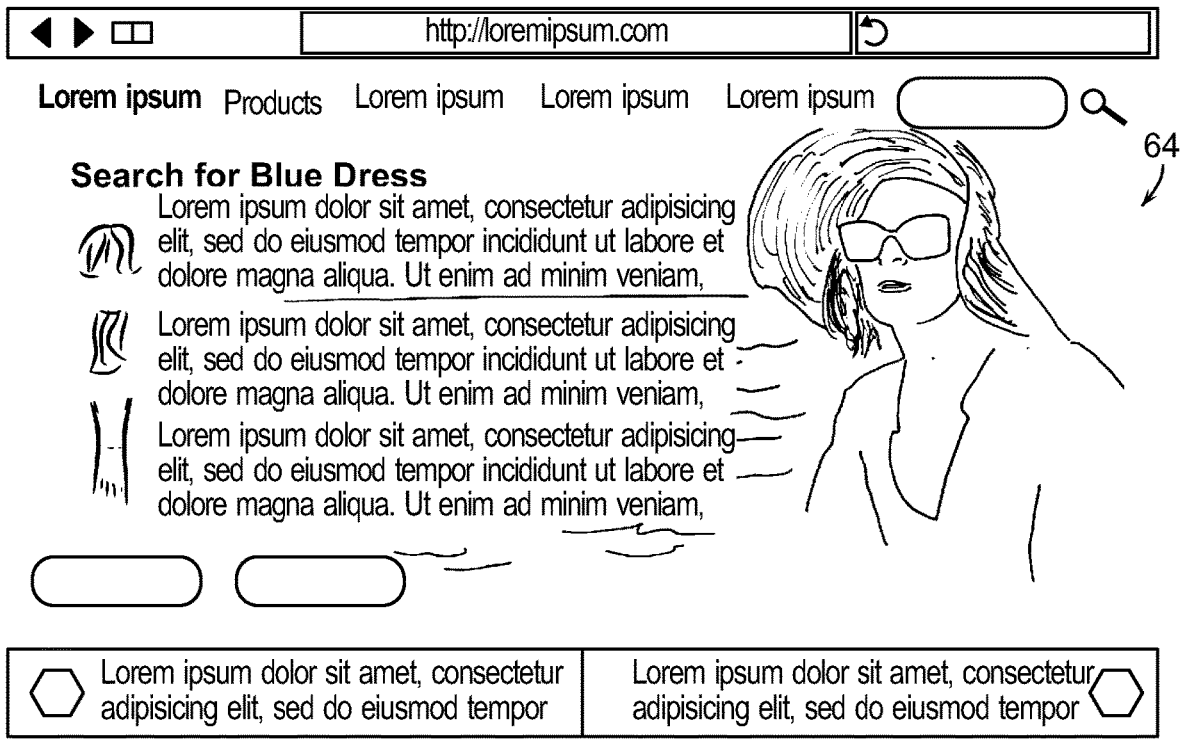
Figure 5C:
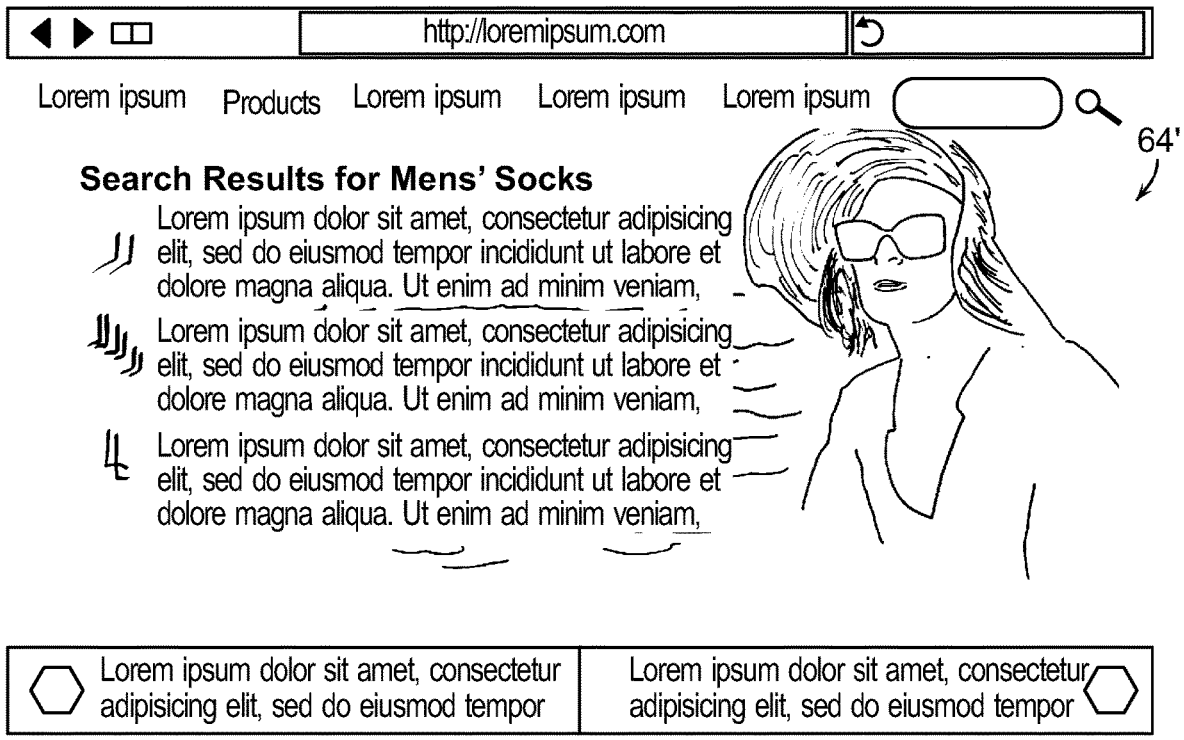

Referring to FIG. 4c, server 12 operating in accord with the teachings hereof consequently generates the user interface 64 showing search results for blue dresses. Referring to FIG. 5c, server 12 likewise generates the user interface 64' showing search results for mens' socks. The user interface 64 differs from 64' as expected: the users' searches differed from one another ("blue socks" vs "mens' socks") and, hence, the respective search results differ.

Figure 4D:
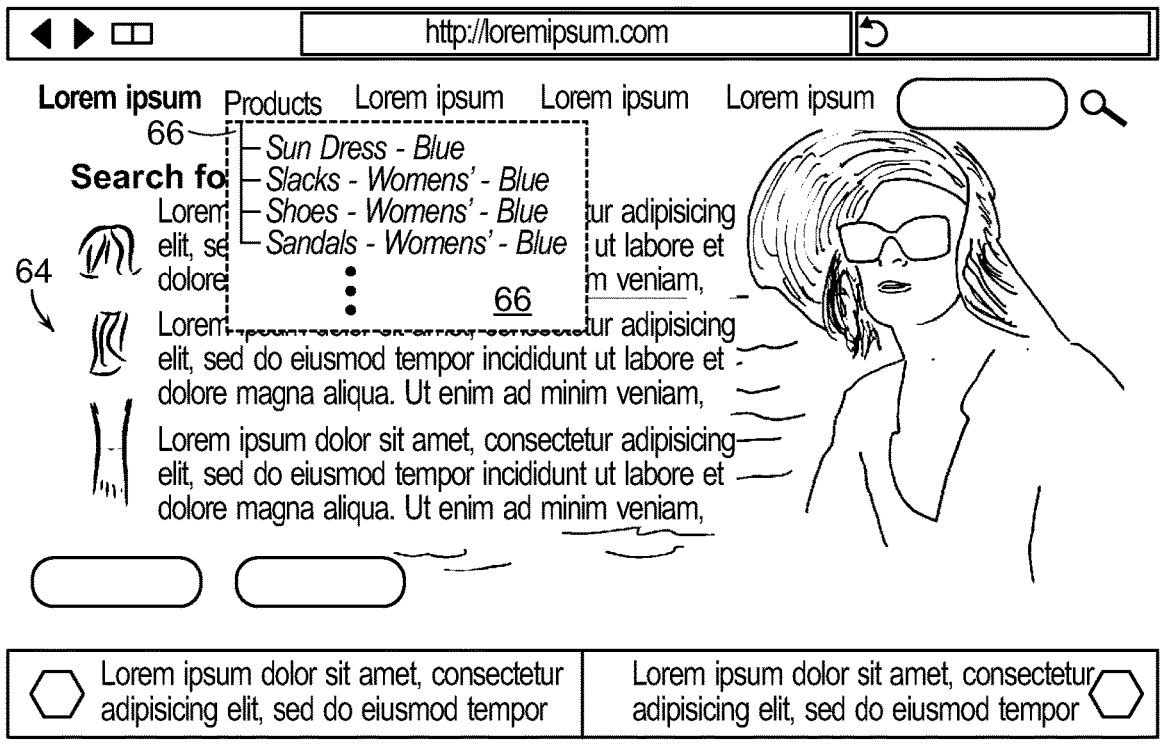

Referring to FIG. 4d, the user of device 16 subsequently clicks on the dynamic "Products" menu item 66 of the user interface 64 of device 16. The user interface is updated by the server 12 and/or client device 16 operating as discussed above to reflect a roster of products based on the respective user's recent search for blue dresses; here, by way of example, the interface lists blue sun dresses, blue womens' slacks, blue womens' shoes, and blue womens' sandals.

Figure 5D:
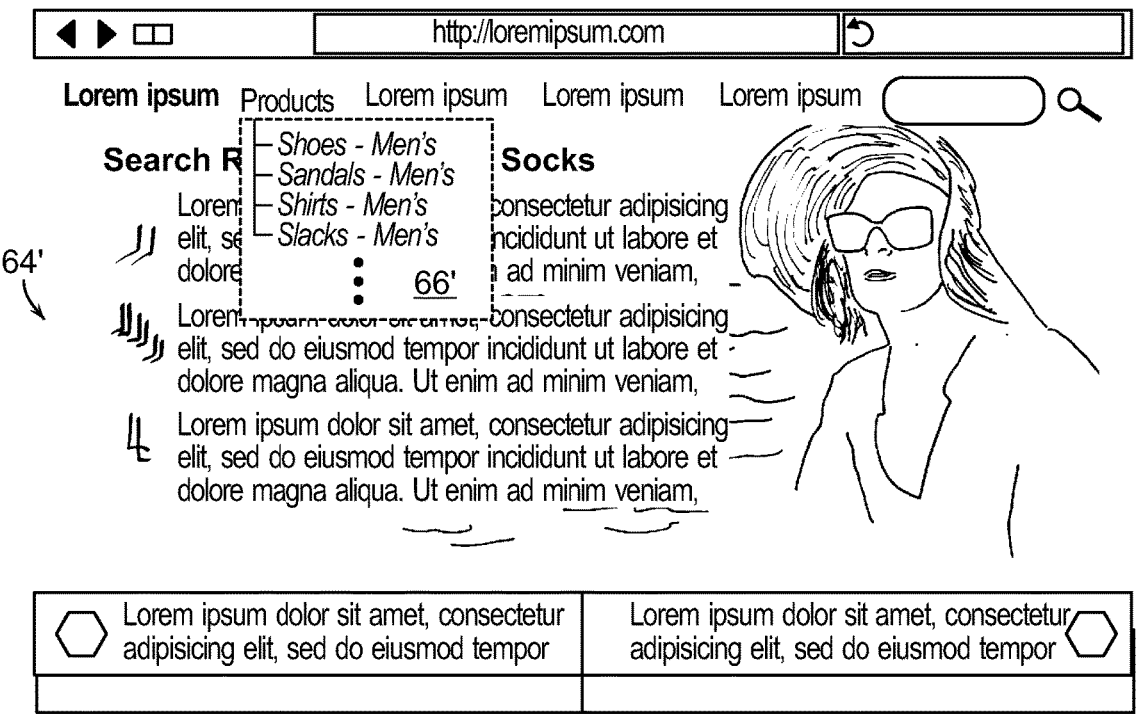

Referring to FIG. 5d, when the user of device 18, on the other hand, clicks on the dynamic "Products" menu item 66' of the corresponding user interface 64' of device 18, the user interface is updated by the server 12 and/or client device 16 to reflect an entirely differ roster of products based on the respective user's recent search for mens' socks; here, by way of example, the interface lists mens' shoes, mens' sandals, mens' shirts, and mens' slacks.

Unlike prior art systems, the "Products" menu, by way of non-limiting example, of the interfaces 66 and 66' differ. Each is influenced by the respective user's prior choices of items of interest (here, searches for blue dresses vs mens' socks).

Figure 4E:
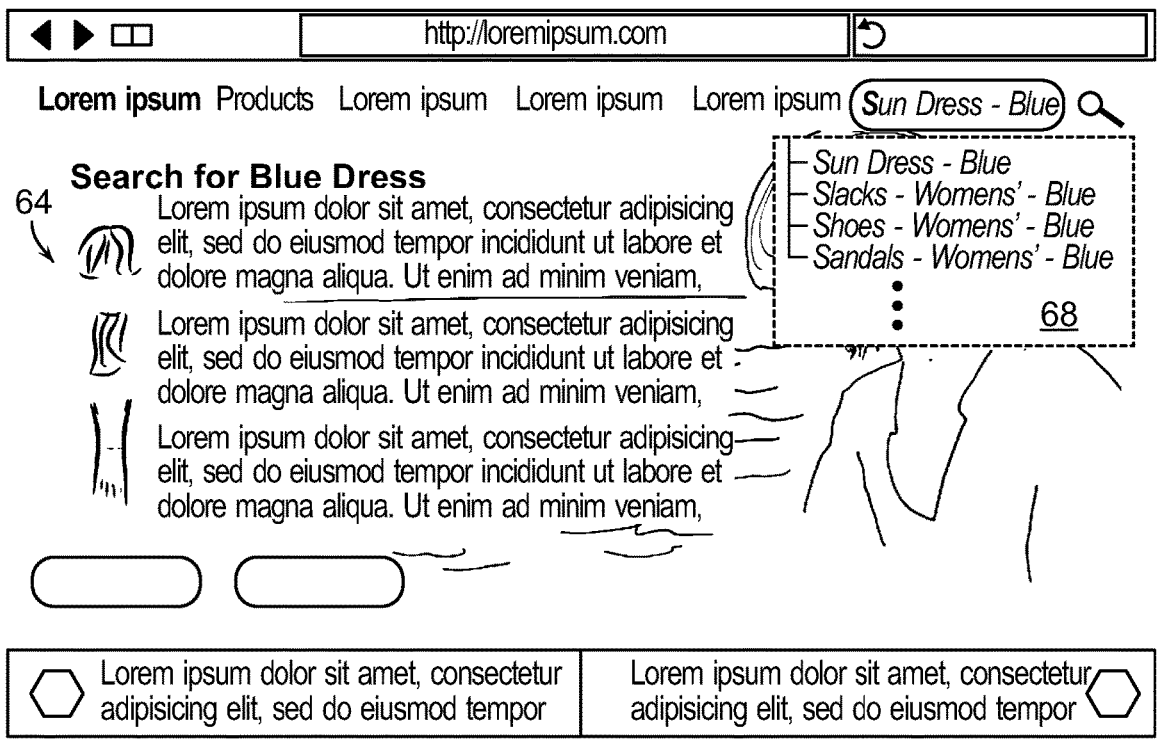
Figure 5E:
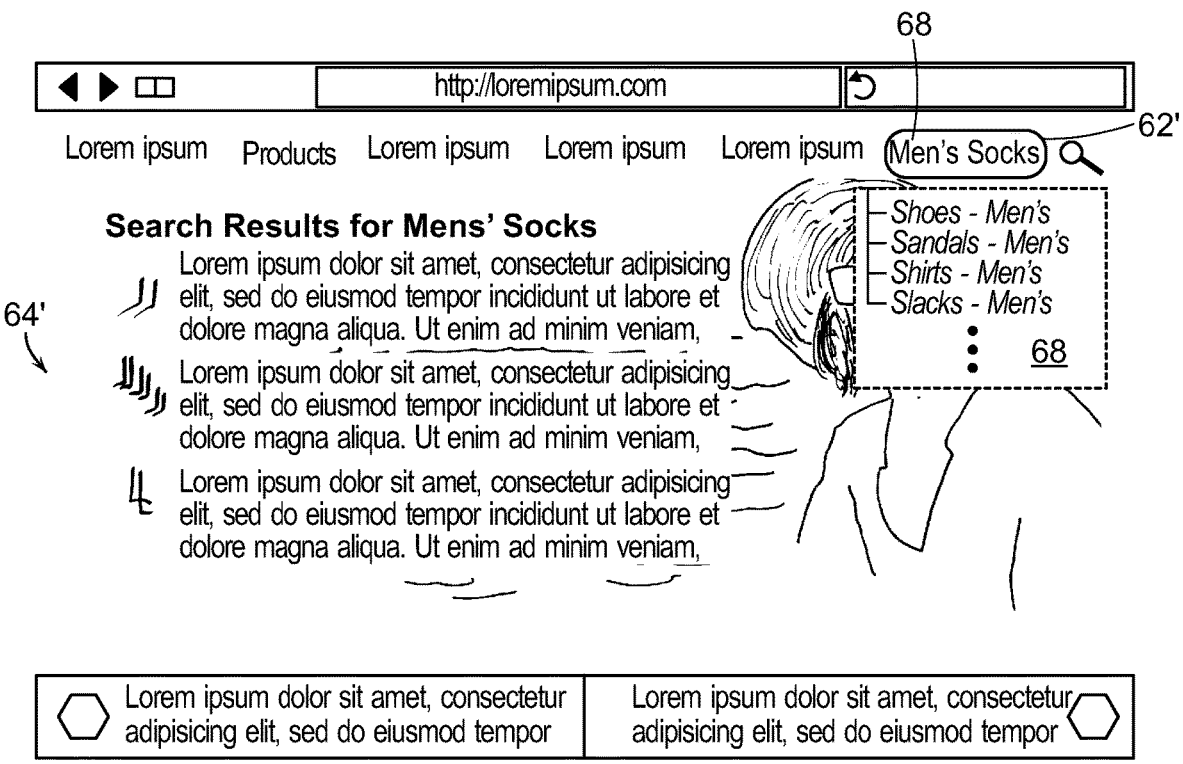

Referring to FIGS. 4e, 5e, this is likewise the case when the respective users begin entering a search, say, beginning with the letter "s" 68 into the respective search boxes 62, 62'. The user interface generated by the illustrated system makes type-ahead search suggestions of "blue sun dresses," "blue womens' slacks," "blue womens' shoes," and "blue womens' sandals," by way of example, in the case of user interface 64 generated for and presented on client device 16, yet, it makes type-ahead search suggestions of "mens' shoes," "mens' sandals," "mens' shirts," and "mens' slacks," by way of example, in the case of user interface 64' generated for and presented on client device 18. Here, again, the user interfaces 64, 64' are influenced by the respective user's prior choices of items of interest.

Generation and presentation of the user interfaces in FIGS. 4a-4e and 5a-5e, discussed above, is merely by way of example. It will be appreciated that prior behavior of the users of devices 16, 18 may influence generation of those user interfaces in other ways, instead or in addition. This is illustrated by way of further example in FIGS. 6a-6g and 7a-7g, each showing further sequences of user interfaces generated by the server 12 and presented to respective users of client devices 16, 18 by browsers 31 executing on those devices in a system according to the invention. As in the examples above, in the embodiments shown in FIGS. 6a-6g and 7a-7g, it is assumed for sake of simplicity that vectors reflecting context-indicative items of interest for both users/devices are maintained by application 30 only from the beginning of the respective browser sessions.

Figure 6A:
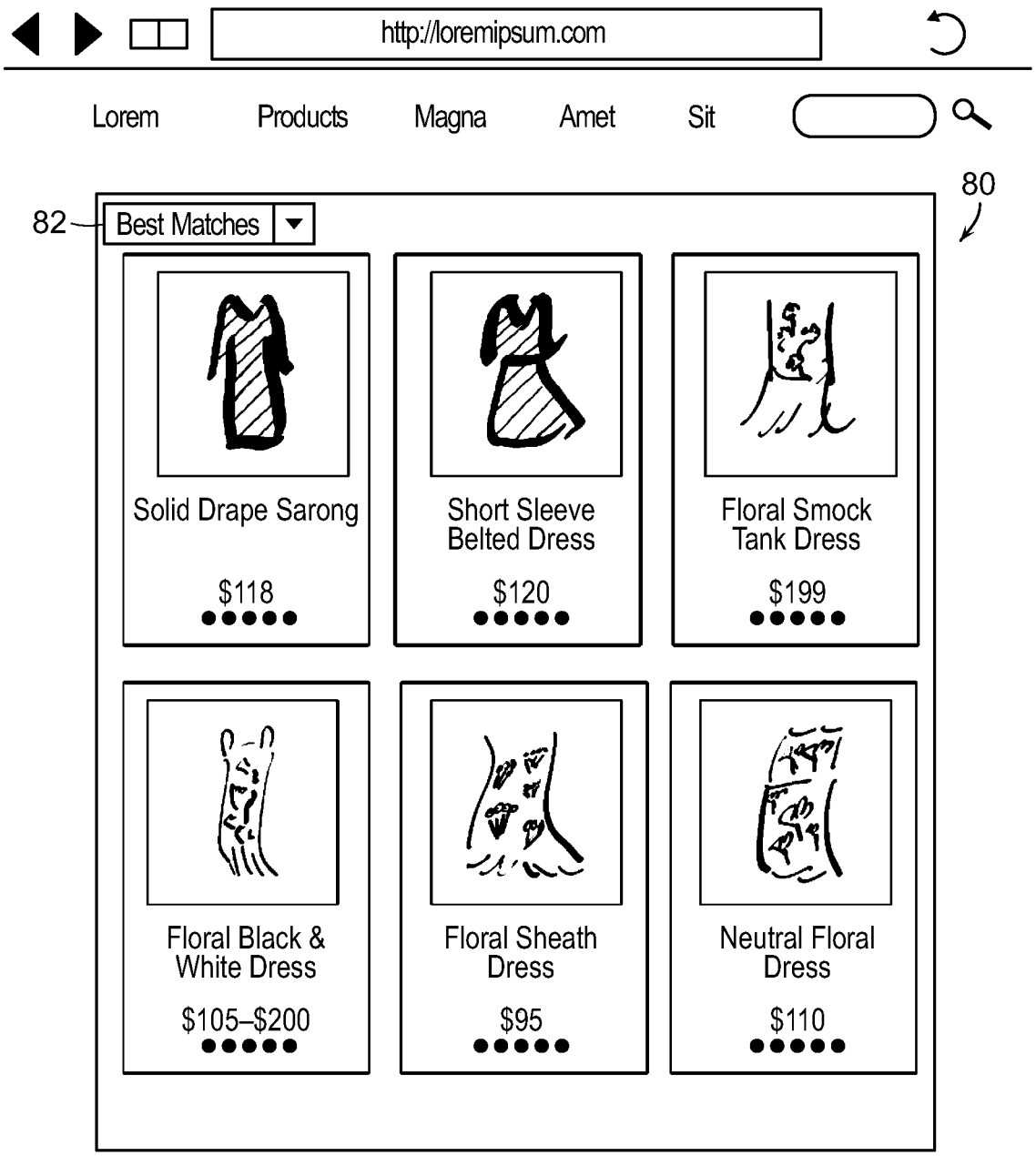
FIGS. 6a-6g depict another sequence of user interfaces of the sort generated for a first user by a system according to the invention.
Figure 6A:
Figure 6B:
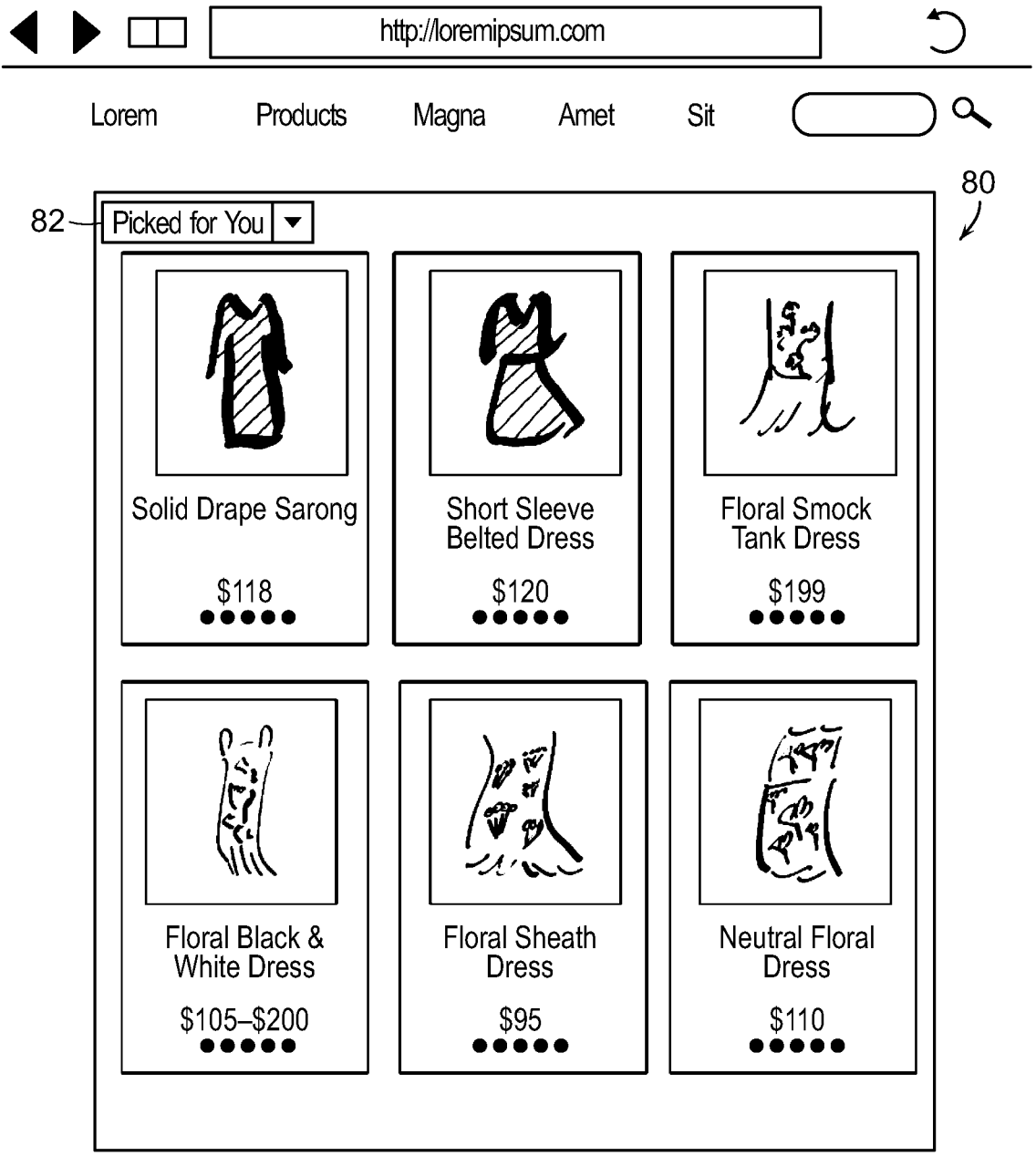
Figure 6B:

FIG. 6a depicts a product browse web page 80 generated by server 12 and presented by browser 31 of device 16 as a user interface in response to a request by the user of that device 16, via its browser 31 and user interface widget 82, for "best matches," here, vis-a-vis the user's prior indication of interest (via a menu selection or otherwise, not shown) in womens' dresses. FIG. 6b depicts that same product browse page 80 generated by server 12 for that user in response to his/her request, again, via widget 82, for "picked for me" items, i.e., items likely to be of particular interest to the user based on his/her prior selections. The server 12 generates essentially the same user interface displaying a generalized collection of dresses in both instances (i.e., the items displayed in the user interface 80 of FIG. 6a are the same as those displayed in FIG. 6b) because in this example vectors reflecting the user's context-indicative items of interest have not yet been populated.

Figure 6C:
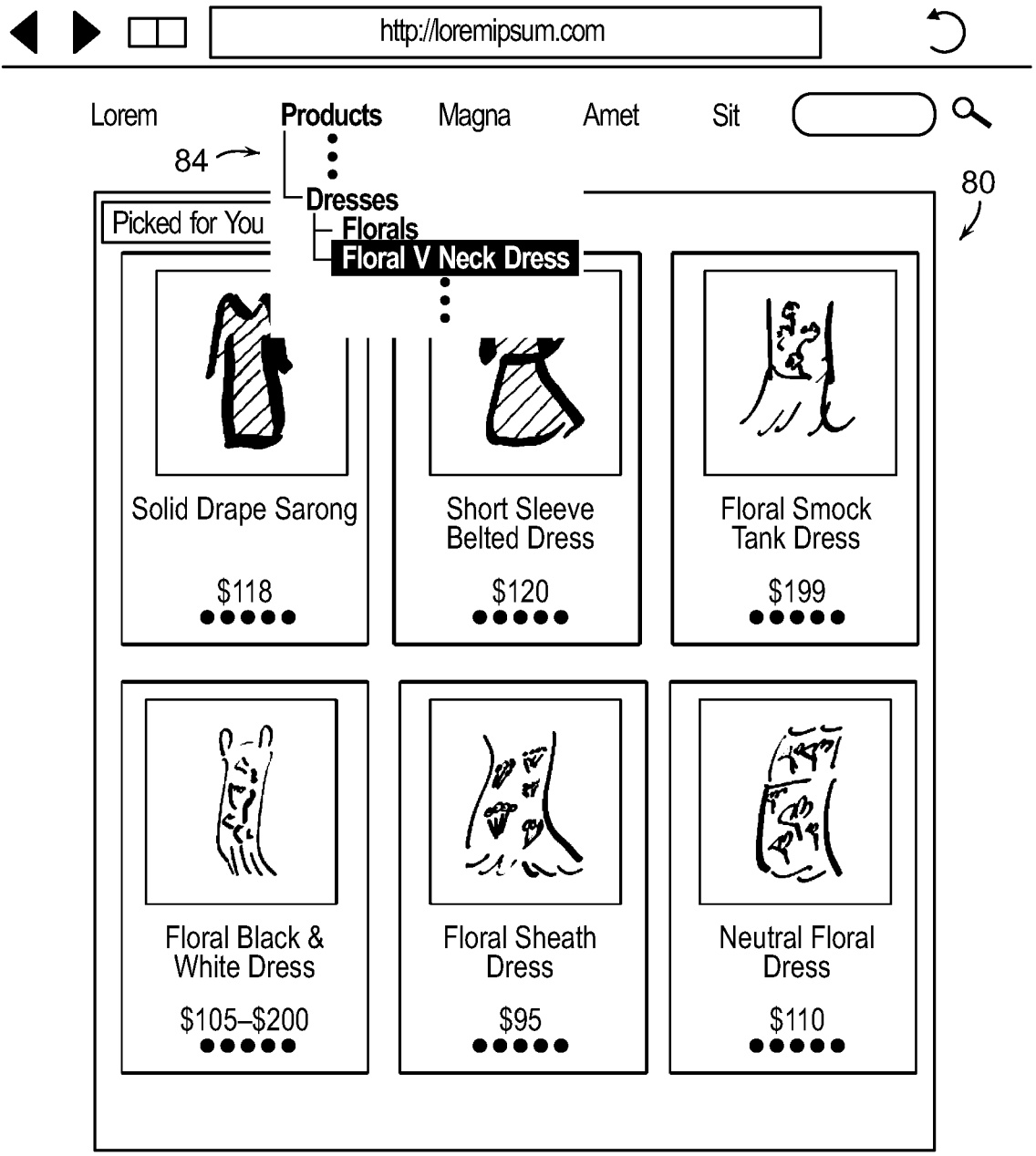
Figure 6C:
Figure 6D:
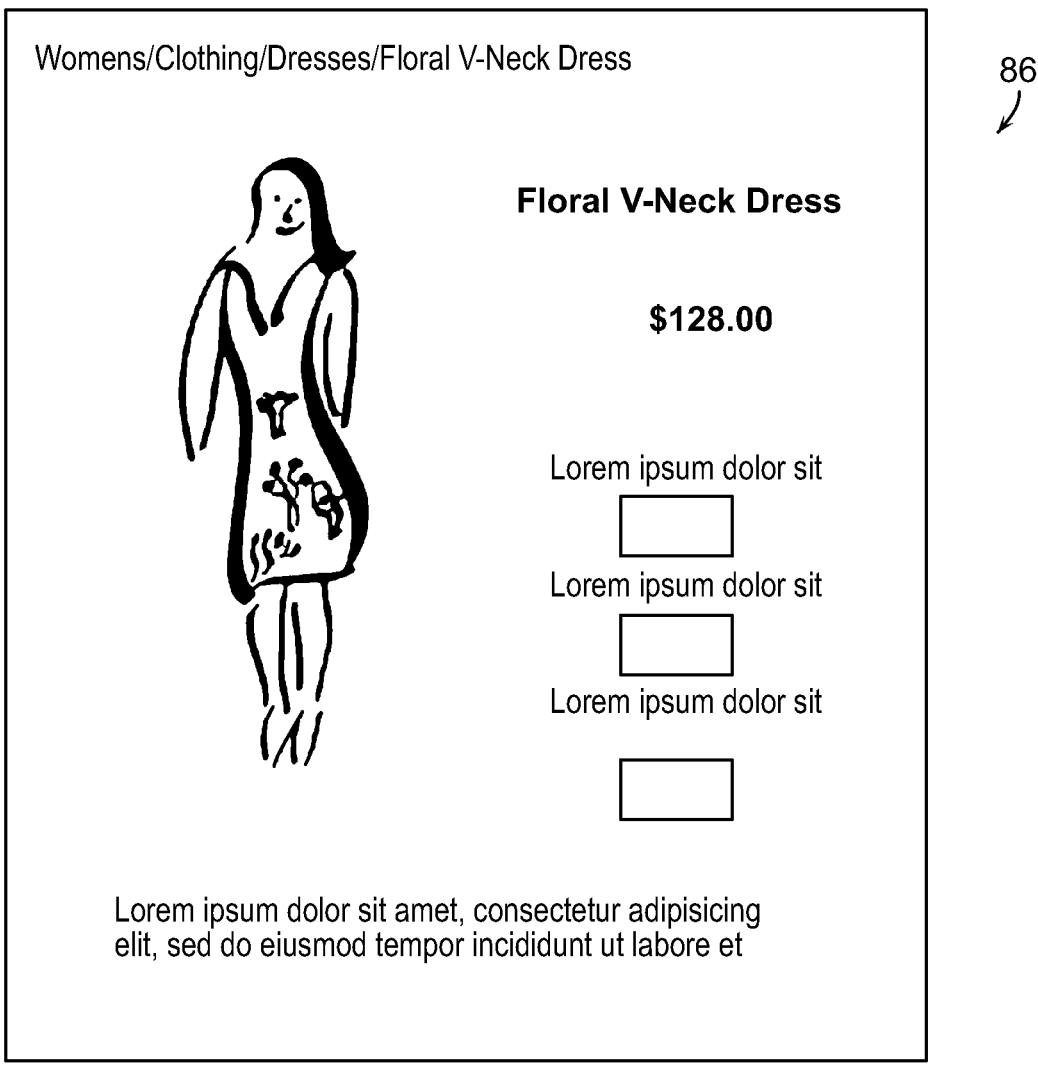
Figure 6E:

Referring to FIGS. 6c-e, the user of device 16 subsequently browses for various floral dresses using menu widget 84. Specifically, in FIG. 6c, the user employs that widget to select "Floral V-Neck Dresses." The server 12 responds by generating the product-specific user interface page 86 shown in FIG. 6d. When the user then employs that widget 84 to select (in a manner similar to that shown in FIG. 6c), a floral black & white dress, the server 12 responds by generating the product-specific user interface page 86' shown in FIG. 6e.

Figure 6F:
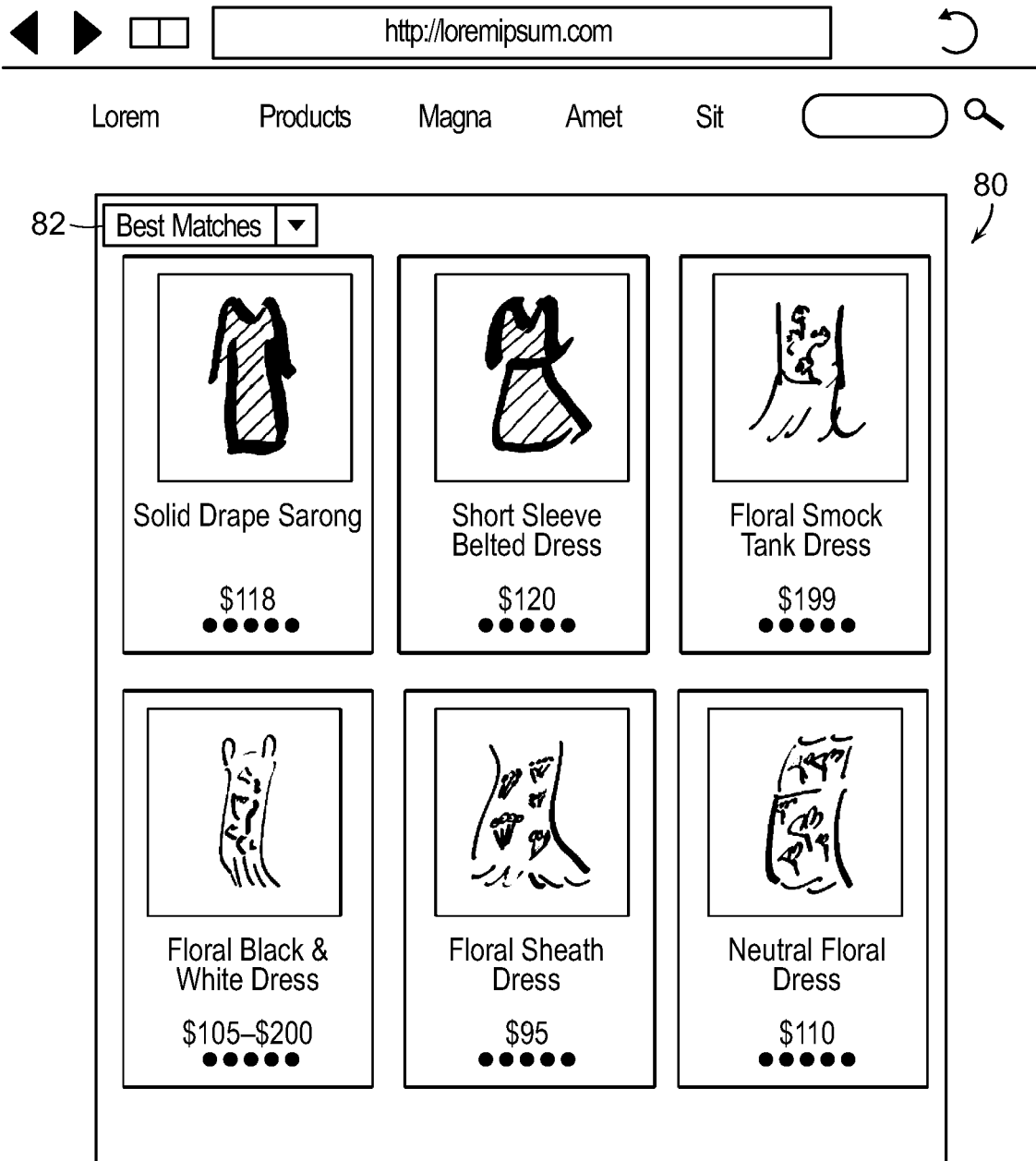
Figure 6G:
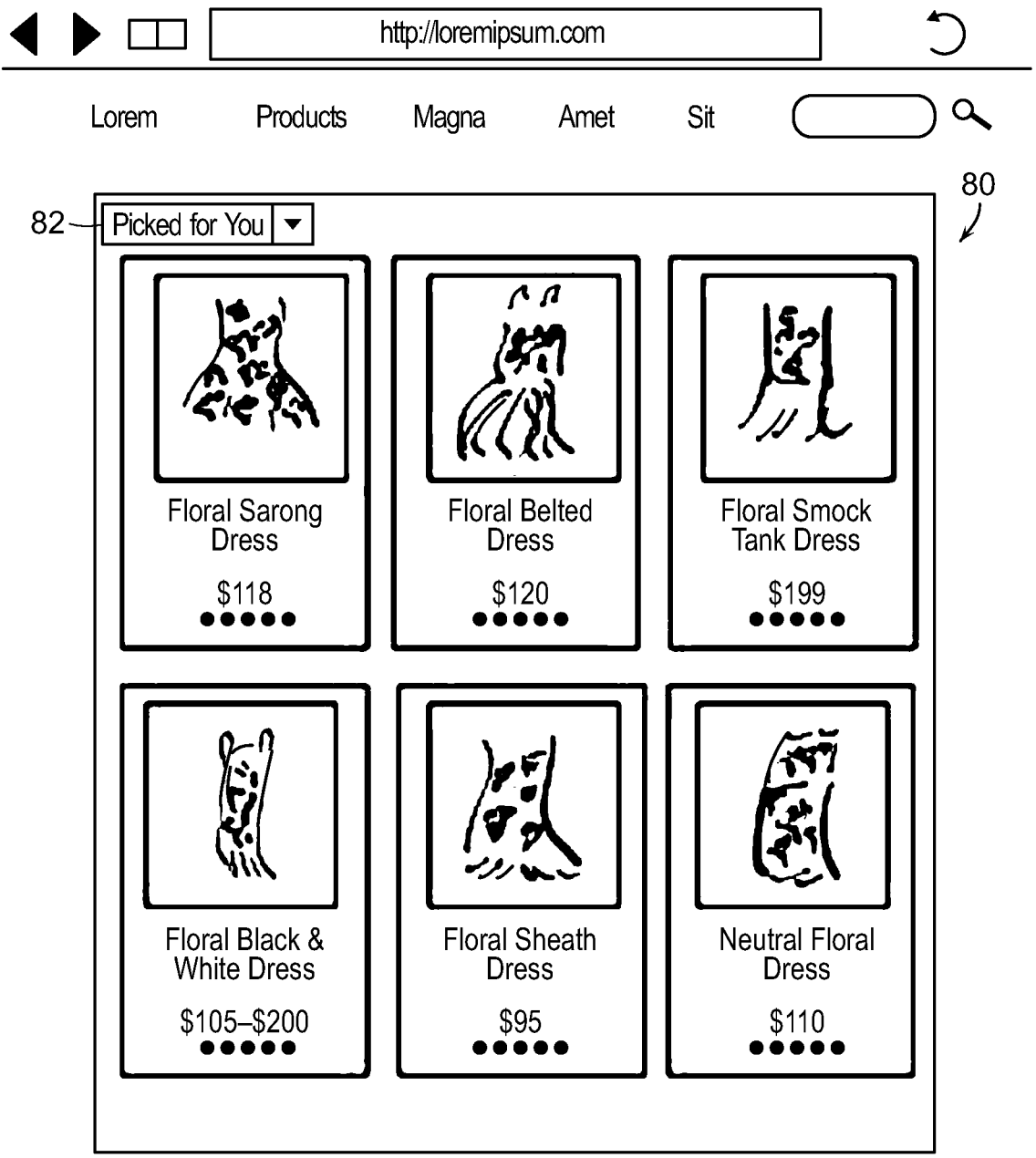

Referring to FIG. 6f, when the user of device 16 subsequently revisits (via a menu selection or otherwise, not shown) the product browse web page 80 for womens' dresses and requests "best matches" via widget 82, the server 12 generates and the browser 31 of device 16 presents the same user interface 80 as it had in connection with FIG. 6a showing the generalized collection of dresses. However, when the user requests "picked for me" items, the server 12 now generates (and the browser 31 of device 16 presents) a different product browse user interface 80'. Rather than showing a generalized collection of dresses, the user interface 80' shows a customized collection of items, one that is skewed toward (if not dominated by) floral selections. This is a consequence of operation of the system according to the invention in view of the user's selection of floral numbers as shown per FIGS. 6c-e.

Figure 7A:
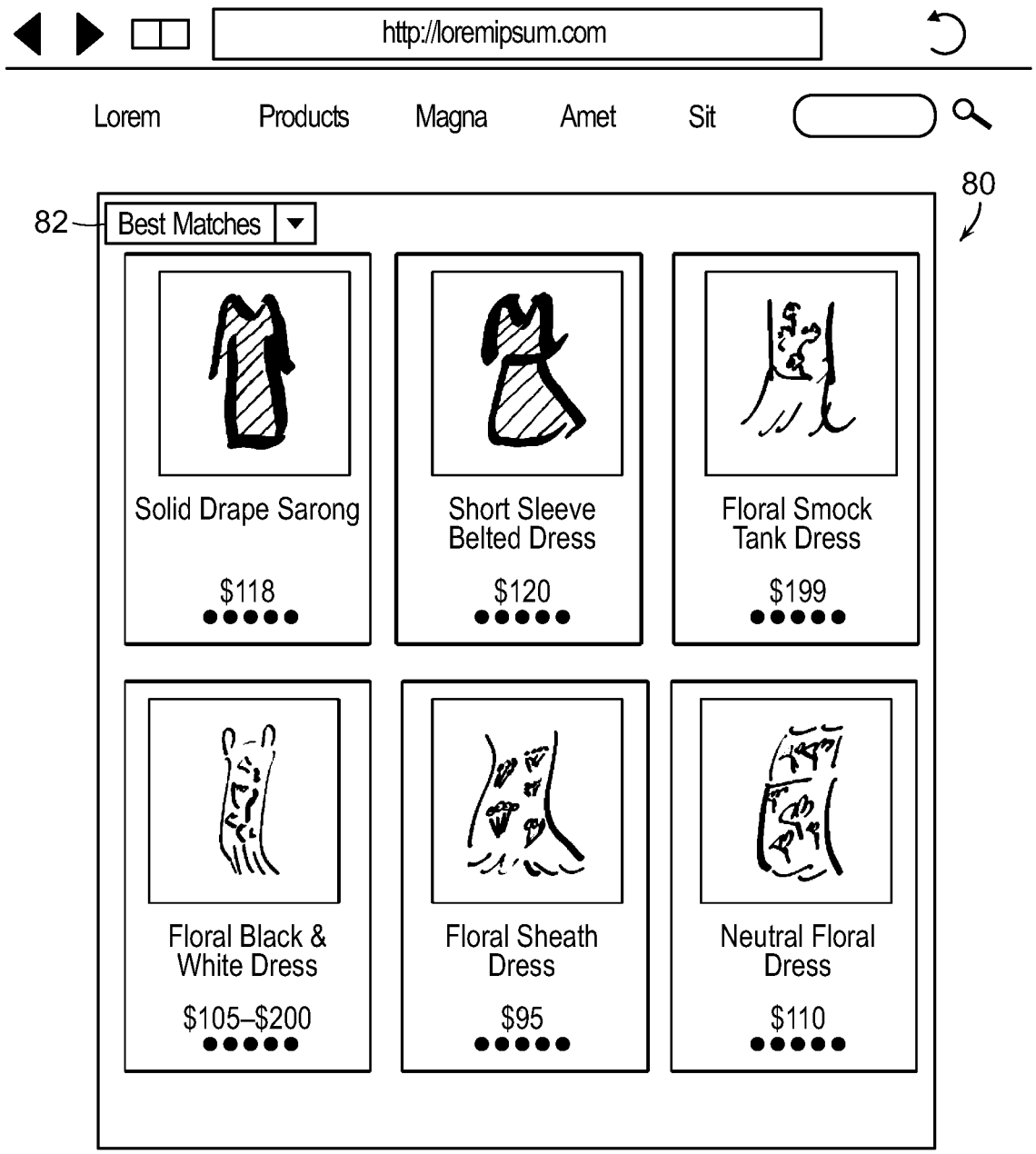
FIGS. 7a-7g depict another sequence of user interfaces of the sort generated for a second user by a system according to the invention.
Figure 7B:
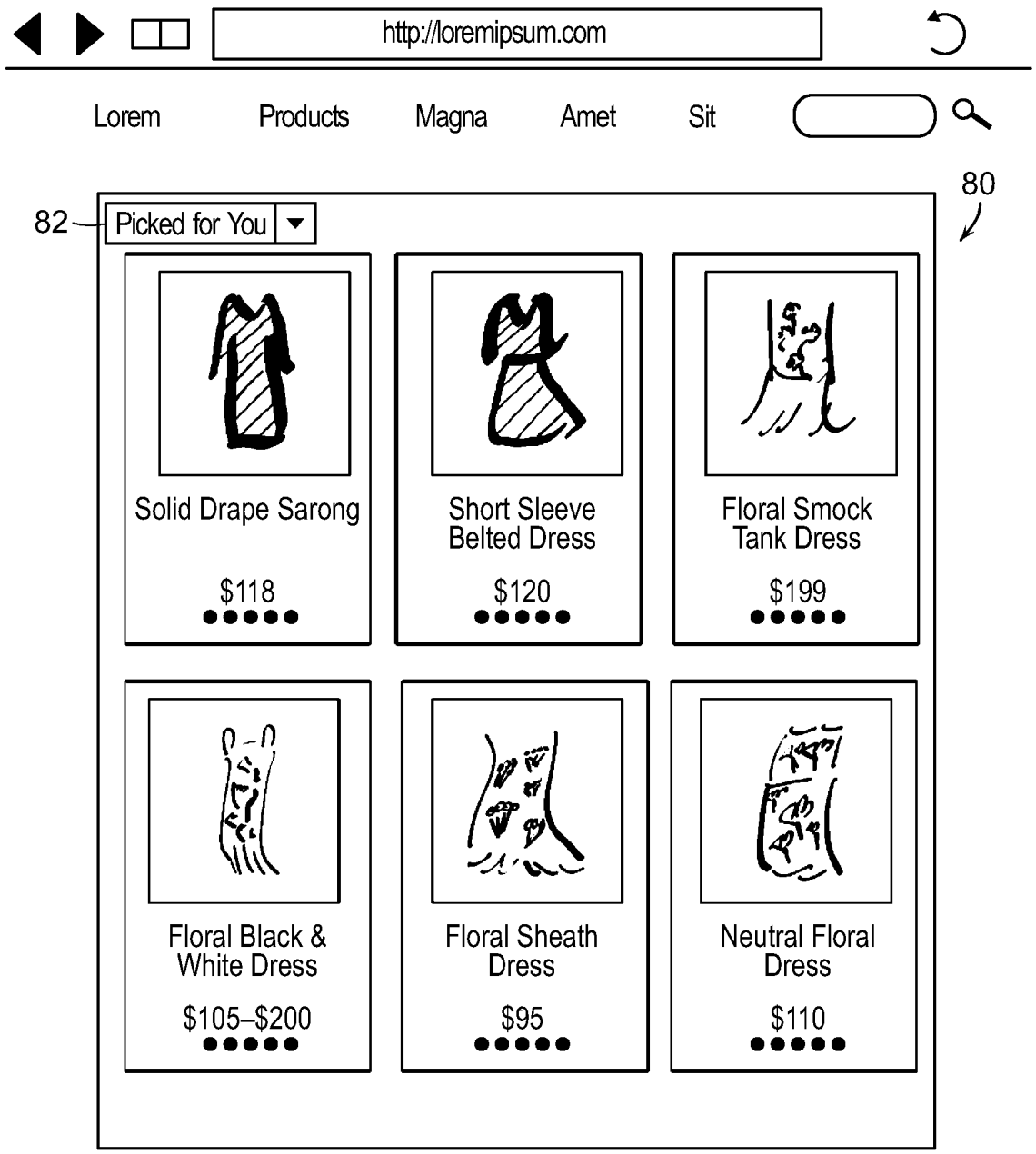

Paralleling the discussion of FIGS. 6a-6g above, FIG. 7a depicts a product browse web page 80 generated by server 12 and presented by browser 31 of device 18 as a user interface in response to a request by the user of that device 18, via its browser 31 and user interface widget 82, for "best matches," again here, vis-a-vis the user's prior indication of interest (via a menu selection or otherwise, not shown) in womens' dresses. FIG. 6b depicts that same product browse page 80 generated by server 12 for that user in response to his/her request, again, via widget 82, for "picked for me" items. As above, the server 12 generates essentially the same user interface displaying a generalized collection of dresses in both instances (i.e., the items displayed in the user interface 80 of FIG. 7a are the same as those displayed in the user interface depicted in FIG. 7b) because vectors reflecting the user's context-indicative items of interest have not yet been populated.

Figure 7C:
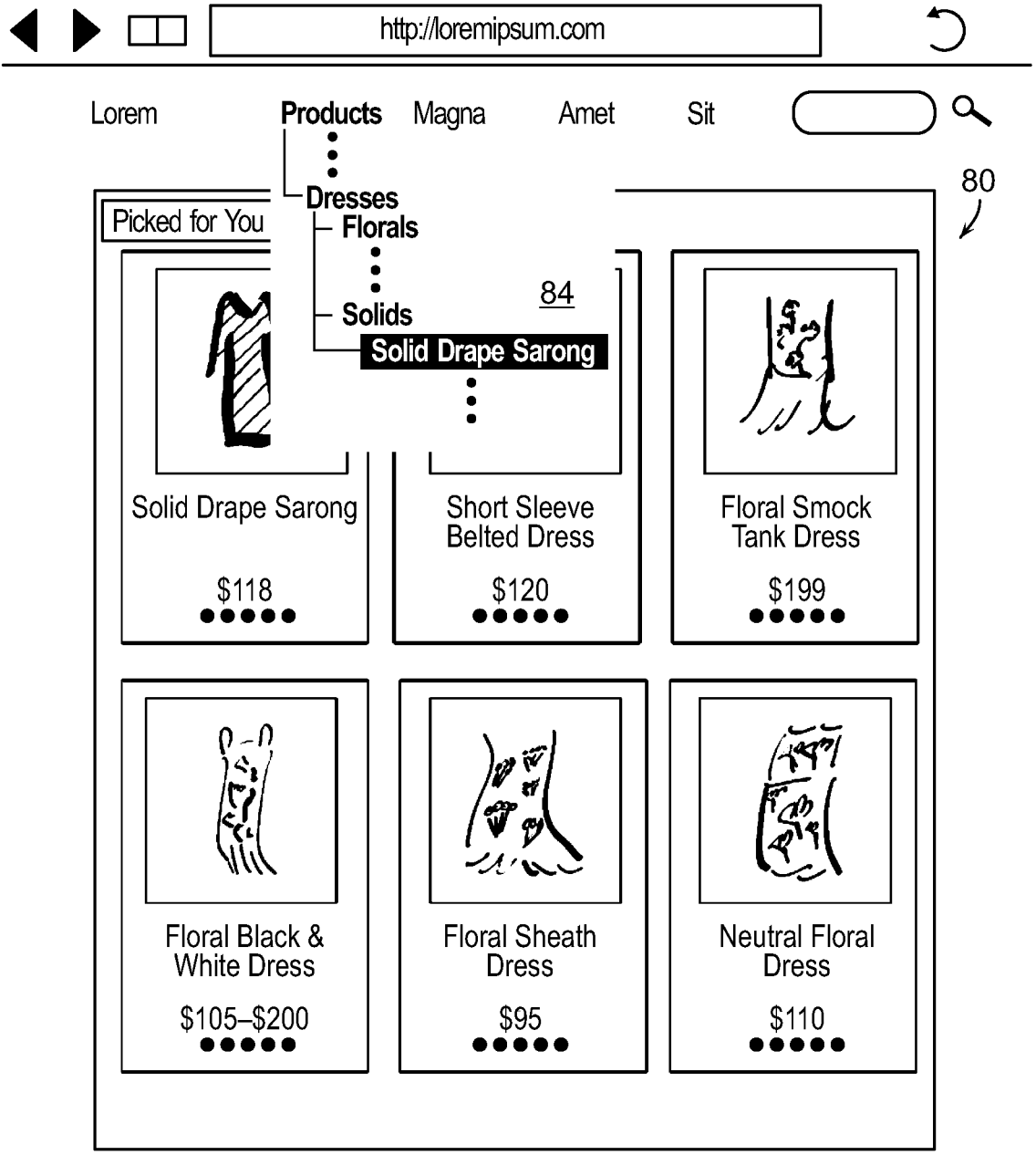
Figure 7D:
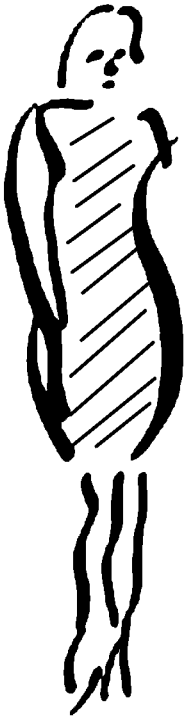
Figure 7E:
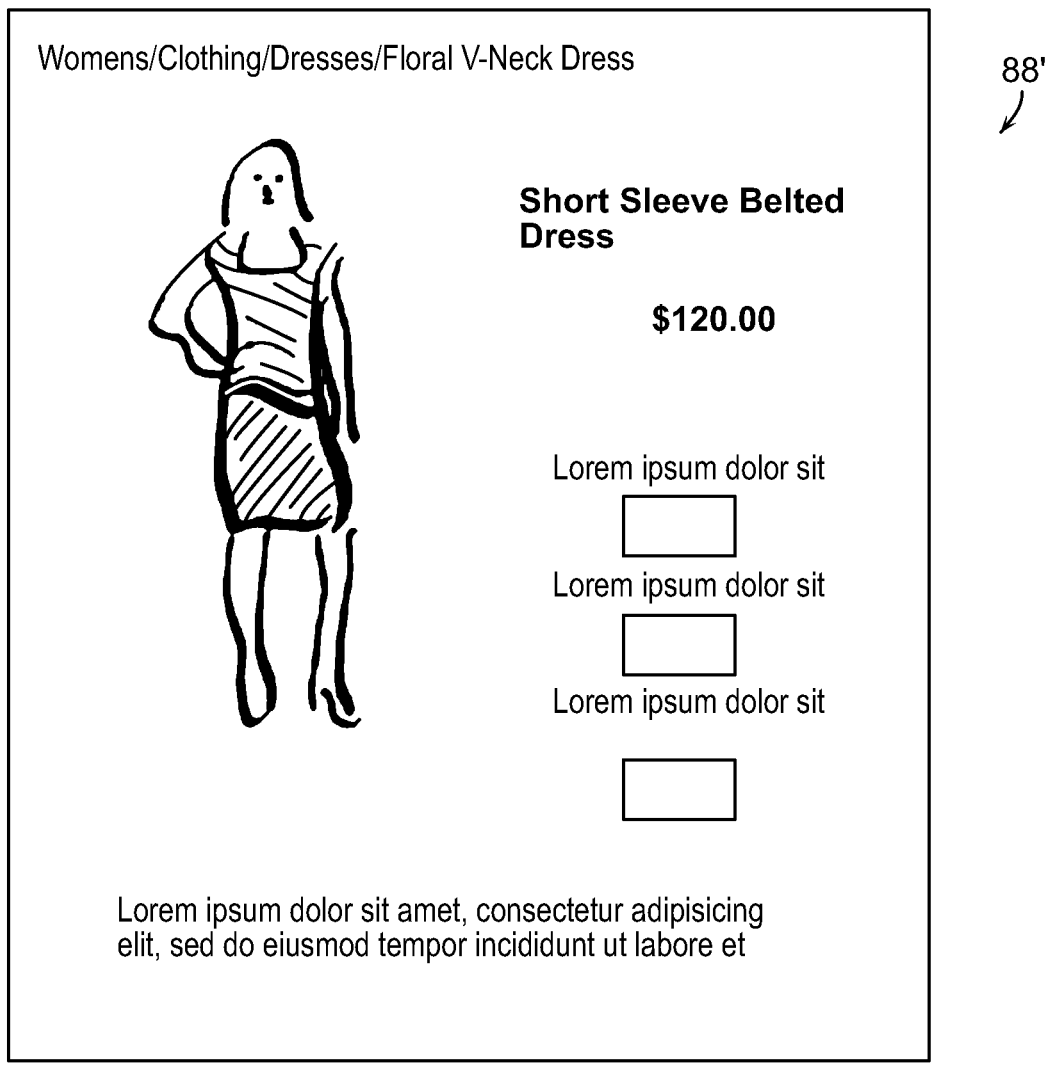

Referring to FIGS. 7c-e, the user of device 18 subsequently browses for various solid numbers using menu widget 84. Specifically, in FIG. 7c, the user employs that widget to select "Solid Drape Sarong." The server 12 responds by generating the product-specific user interface page 88 shown in FIG. 7d. When the user then employs widget 84 to select (in a manner similar to that shown in FIG. 7c), a (solid) short sleeve belted dress, the server 12 responds by generating the product-specific user interface page 88' shown in FIG. 7e.

Figure 7F:
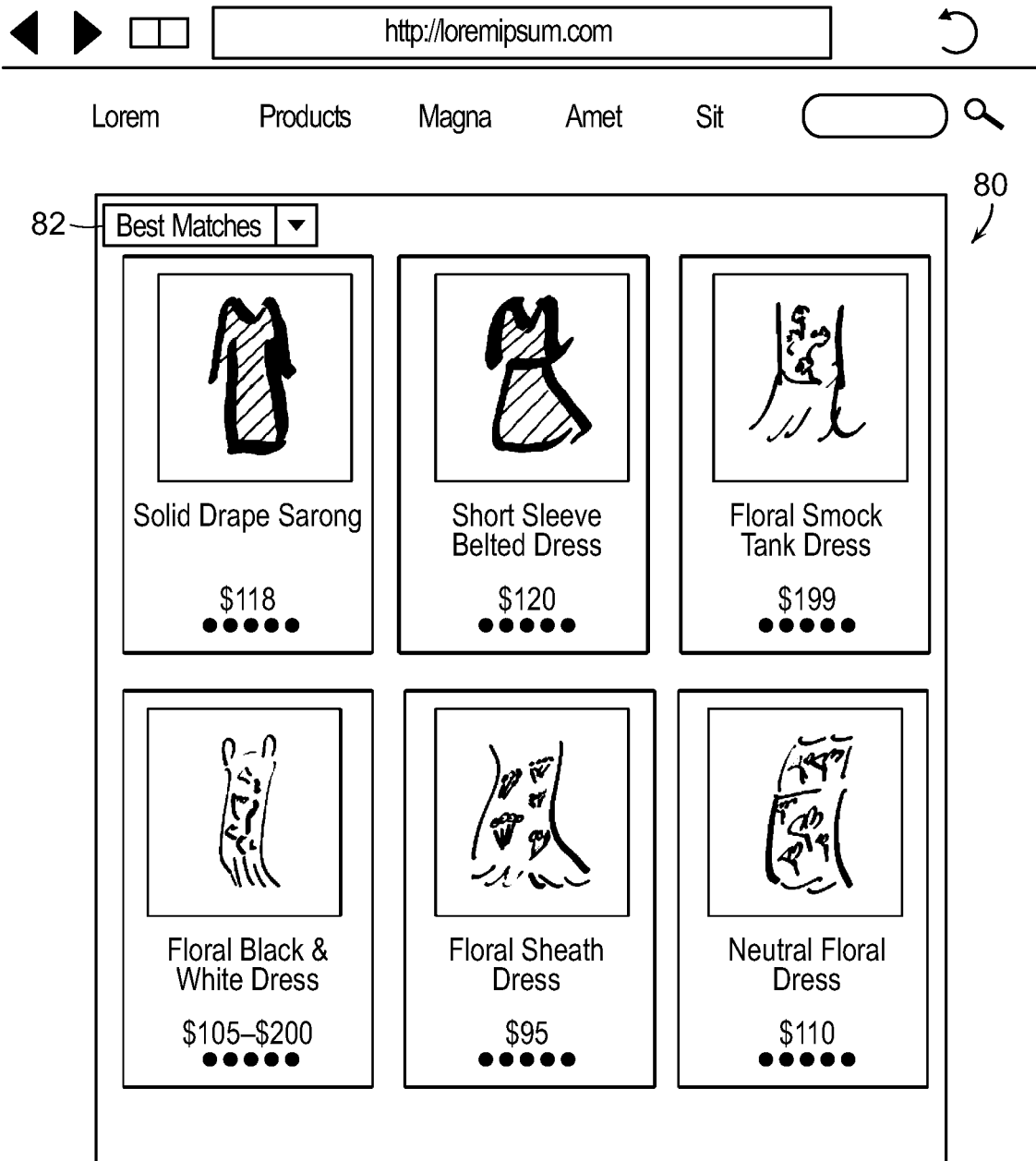
Figure 7F:
Figure 7G:
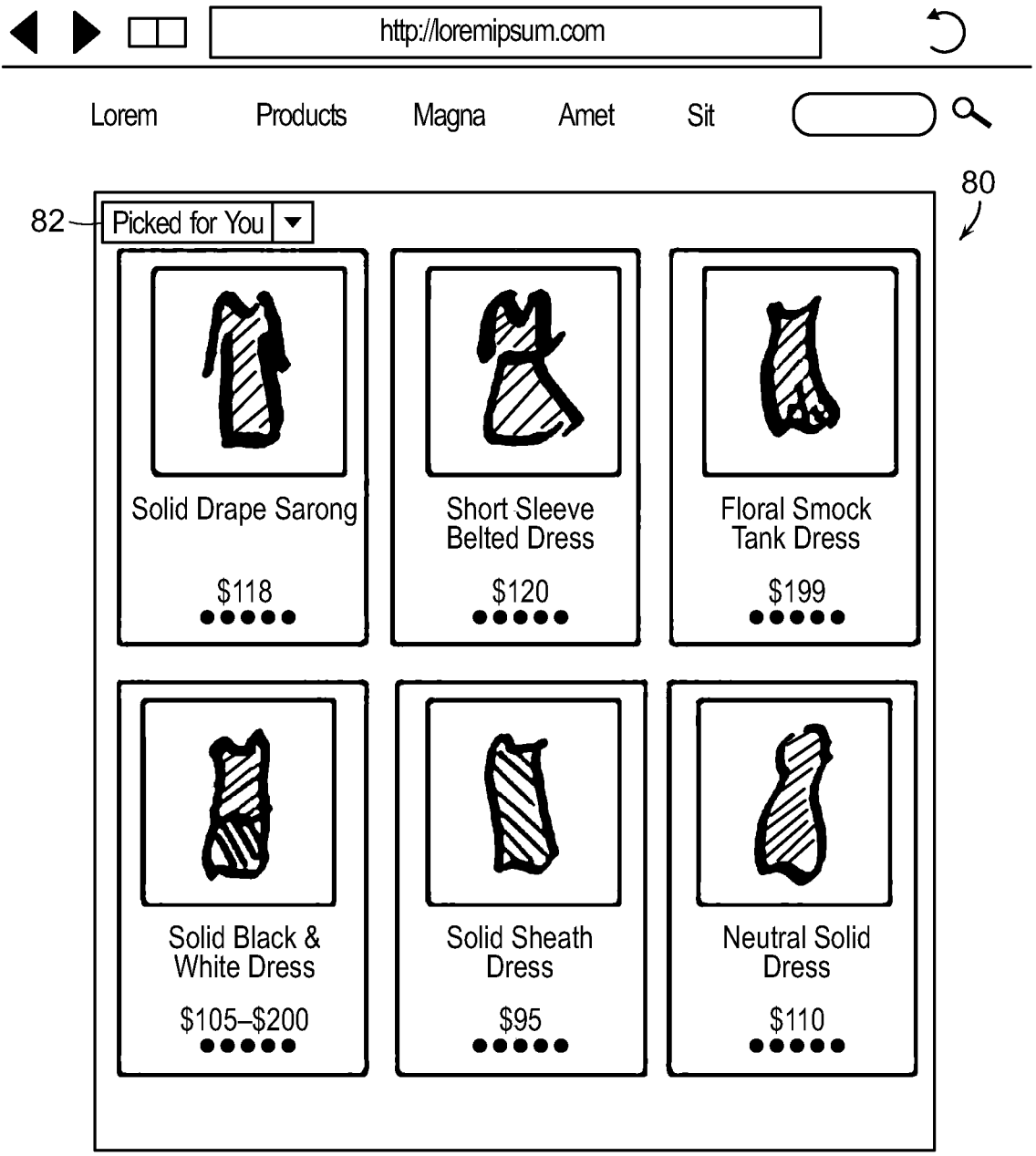

Referring to FIG. 7f, when the user of device 18 subsequently revisits (via a menu selection or otherwise, not shown) the product browse web page 80 for womens' dresses and requests "best matches" via widget 82, the server 12 generates and the browser 31 of device 16 presents the same user interface 80 as it had in connection with FIG. 7a showing the generalized collection of dresses. However, when the user requests "picked for me" items, the server 12 generates (and the browser 31 of device 18 presents) a different product browse user interface 90. Rather than showing a generalized collection of dresses, the user interface 90 shows a customized collection of items skewed toward solid selections. Again, this is a consequence of the operation of the system according to the invention in view of the user's selection of solids in connection with FIG. 7c-e.

Described above are systems and method achieving the objects set forth previously, among others.

It will be appreciated that the embodiments shown here are merely examples of the invention and that other embodiments making changes thereto fall within the scope of the invention, of which we claim:

1. A method comprising:
generating a user interface under control of one or more processors, the one or more processors performing operations comprising:
(A) generating at least a first portion of the user interface that is presented to a user in connection with execution of an application;
(B) capturing a context of the user's usage of the application based on one or more textual, graphical and/or other components of the user interface with which the user interacts during a selected period, where the one or more components represent respective context-indicative items;
(C) generating a first vector for the user based on the captured context, the generating the first vector comprising, for each respective context-indicative item of the respective context-indicative items, identifying the respective context-indicative item from an identifier supplied as a tag used to present the respective context-indicative item;
(D) generating a second vector for the user, the second vector generated as a dot product of the first vector and a matrix, the matrix comprising a plurality of characteristics for each potential item of interest of a plurality of potential items of interest, the plurality of characteristics corresponding to a plurality of respective dimensions of a multidimensional factor space;
(E) setting a cookie unique to the user, wherein the cookie contains the second vector;
(F) ranking, responsive to a request from the user, each potential item of interest of the plurality of potential items of interest, wherein the ranking comprises generating a third vector based on the second vector contained in the cookie;
(G) responsive to the ranking, generating at least a second portion of the user interface by rendering a plurality of components with which the user may interact, wherein
the rendered plurality of components corresponds to at least a subset of the plurality of potential items of interest, and
the rendered plurality of components is presented in a priority based the ranking each potential item of interest of the plurality of potential items of interest.

2. The method of claim 1, wherein the multidimensional factor space includes explicit features include one or more of an item type, color, size, material, price, and on-promotion indicator.

3. The method of claim 2, wherein the multidimensional factor space includes at least three of the explicit features.

4. The method of claim 1, wherein the request from the user further comprises a search request made by the user via the user interface.

5. The method of claim 4, wherein the rendered plurality of components comprises search results listing at least one of the plurality of potential items of interest.

6. The method of claim 1, wherein the application is one of a web browser or e-commerce app.

7. The method of claim 6, wherein the capturing the context further includes monitoring components clicked by the user to identify, as the context-indicative items, one of recent items viewed or purchased by the user via the user interface, or in which the user has otherwise shown an interest.

8. The method of claim 6, wherein capturing the context further includes monitoring components representative of product links clicked by the user to identify, as the context-indicative items, one of recent items viewed or purchased by the user via the user interface, or in which the user has otherwise shown an interest.

9. The method of claim 1, wherein the application is a web browser executing markup language associated with a selected URL.

10. The method of claim 1, where the plurality of potential items of interest include any one of products and product categories.

11. The method of claim 1, wherein the plurality of potential items of interest are those which may be accessed one of directly or indirectly via the application.

12. The method of claim 1, wherein the plurality of potential items of interest are those that may be acquired one of directly or indirectly via the application.

13. A method of user interface generation, comprising:
(A) on a first server digital data processor, generating at least a first portion of a user interface that is presented to a user in connection with execution of an application;
(B) on a second server digital data processor, capturing a context of the user's usage of the application based on one or more textual, graphical and/or other components of the user interface with which the user interacts, where the one or more components represent respective context-indicative items, (C) generating, on the second server digital data processor, a first vector for the user based on the captured context, the generating the first vector comprising, for each respective context-indicative item of the respective context-indicative items, identifying the respective context-indicative item from an identifier supplied as a tag used to present the respective context-indicative item;

(D) generating, on the second server digital data processor, a second vector for the user, the second vector generated as a dot product of the first vector and a matrix, the matrix comprising a plurality of characteristics for each potential item of interest of a plurality of potential items of interest, the plurality of characteristics corresponding to a plurality of respective dimensions of a multidimensional factor space;

(E) setting a cookie unique to the user, wherein the cookie contains the second vector;

(F) ranking, responsive to a request from the user, each potential item of interest of the plurality of potential items of interest, wherein the ranking comprises generating a third vector based on the second vector contained in the cookie;

(G) responsive to the ranking, generating, on the first sever digital data processor, at least a second portion of the user interface by rendering a plurality of components with which the user may interact, wherein the rendered plurality of components corresponds to at least a subset of the plurality of potential items of interest, and the rendered plurality of components is presented in a priority based the ranking each potential item of interest of the plurality of potential items of interest.

14. A digital data processing system, comprising:

(A) a first server digital data processor that generates at least a first portion of a user interface that is presented to a user in connection with execution of an application;

(B) a second server digital data processor communicatively coupled to the first server digital data processor, the second server digital data processor captures a context of the user's usage of the application based on one or more textual, graphical and/or other components of the user interface with which the user interacts, where the one or more components represent respective context-indicative items, (C) generating, on the second server digital data processor, a first vector for the user based on the captured context, the generating the first vector comprising, for each respective context-indicative item of the respective context-indicative items, identifying the respective context-indicative item from an identifier supplied as a tag used to present the respective context-indicative item;

(D) generating, on the second server digital data processor, a second vector for the user, the second vector generated as a dot product of the first vector and a matrix, the matrix comprising a plurality of characteristics for each potential item of interest of a plurality of potential items of interest, the plurality of characteristics corresponding to a plurality of respective dimensions of a multidimensional factor space;

(E) setting a cookie unique to the user, wherein the cookie contains the second vector;

(F) ranking, responsive to a request from the user, each potential item of interest of the plurality of potential items of interest, wherein the ranking comprises generating a third vector based on the second vector contained in the cookie;

(G) responsive to the ranking, generating, on the first sever digital data processor, at least a second portion of the user interface by rendering a plurality of components with which the user may interact, wherein the rendered plurality of components corresponds to at least a subset of the plurality of potential items of interest, and the rendered plurality of components is presented in a priority based the ranking each potential item of interest of the plurality of potential items of interest.

\* \* \* \* \*